US012659756B2

(12) United States Patent
Panchal et al.

(10) Patent No.: US 12,659,756 B2
(45) Date of Patent: Jun. 16, 2026

(54) WIRELESS PATHLOSS MODELING AND DEPLOYMENT BASED ON FEEDBACK

(71) Applicant: Charter Communications Operating, LLC, St. Louis, MO (US)

(72) Inventors: Pareshkumar Panchal, Highlands Ranch, CO (US); Muhib Taiye Oduwaiye, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 314 days.

(21) Appl. No.: 18/234,501

(22) Filed: Aug. 16, 2023

(65) Prior Publication Data

US 2025/0063379 A1 Feb. 20, 2025

(51) Int. Cl.
H04W 16/18 (2009.01)
H04B 17/309 (2015.01)

(52) U.S. Cl.
CPC .......... H04W 16/18 (2013.01); H04B 17/347 (2023.05)

(58) Field of Classification Search
CPC .................................................... H04W 16/18
See application file for complete search history.

(56) References Cited

U.S. PATENT DOCUMENTS

| | | | | |
|---|---|---|---|---|
| 2014/0334320 A1* | 11/2014 | Liu | ........................ | H04L 5/0098 |
| | | | | 370/252 |
| 2022/0137176 A1* | 5/2022 | Silverman | ............... | H04W 4/80 |
| | | | | 455/456.1 |

* cited by examiner

*Primary Examiner* — Michael T Vu
(74) *Attorney, Agent, or Firm* — Armis IP Law, LLC

(57) ABSTRACT

Communication management hardware receives a first preliminary wireless pathloss model indicating expected pathloss between a first wireless base station and different locations in a first geographical region. Based on testing, the communication management hardware also receives feedback generated by multiple wireless stations. The feedback indicates actual pathloss associated with the wireless stations in the first geographical region receiving wireless signals from the first wireless base station. The communication management hardware applies the feedback to the first preliminary pathloss model to produce an updated first pathloss model associated with the first geographical region. The communication management hardware repeats this process of producing a respective pathloss model for each of multiple different types of geographical regions. The pathloss models are then subsequently used to determine pathloss in environments similar to the tested geographical regions.

27 Claims, 20 Drawing Sheets

GRAPH
300

SSS_RP
(dBm)

DISTANCE
(METERS)

WIRELESS
SIGNAL ATTENUATED
OVER DISTANCE

GRAPH
600

PATHLOSS
FCN A'

PATHLOSS
FCN A

DISTANCE
(METERS)

SIGNAL
STRENGTH
(dBm)

WIRELESS
SIGNAL ATTENUATED
OVER DISTANCE

| Clutter | count | mean | std | min | 25% | 50% | 75% | Error_P~M max |
|---|---|---|---|---|---|---|---|---|
| 11 - Forested | 264.0 | -4.386288 | 13.768320 | -37.52 | -9.9250 | -2.875 | 9.1675 | 27.16 |
| 14 - Residential with trees | 82.0 | -14.034024 | 10.510424 | -25.46 | -21.1175 | -17.816 | -15.6200 | 14.02 |
| 15 - Commercial/Industrial | 25.0 | -9.854800 | 11.373293 | -24.33 | -20.8700 | -10.110 | -3.4200 | 13.40 |
| 4 - Open in Urban | 4920.0 | -9.239857 | 10.971326 | -37.00 | -17.0900 | -10.975 | -4.5300 | 31.47 |
| 6 - Grassland/Agriculture | 96.0 | -8.510208 | 12.552394 | -22.71 | -19.7375 | -13.735 | 3.4100 | 22.88 |
| 8 - Surface Streets | 33388.0 | -4.184384 | 11.094440 | -49.18 | -11.3675 | -4.830 | 4.4100 | 28.72 |
| 9 - Highways | 3470.0 | -1.855043 | 11.400494 | -35.83 | -8.0650 | -2.030 | 5.4600 | 31.27 |

|  | count | mean | std | min | 25% | 50% | 75% | Error_p-M max |
|---|---|---|---|---|---|---|---|---|
| Location |  |  |  |  |  |  |  |  |
| Cell Center | 2930.0 | -10.251048 | 6.570972 | -48.18 | -13.9375 | -10.510 | -7.4125 | 16.31 |
| Cell Edge | 3014.0 | -5.543646 | 13.092812 | -37.40 | -16.6775 | -6.500 | 5.1300 | 31.47 |
| Cell Middle | 3188.0 | -5.091305 | 12.175580 | -39.87 | -16.8625 | -4.955 | 5.1675 | 24.32 |

| Error_p-M | |
|---|---|
| count | 9132.000000 |
| mean | -6.896102 |
| std | 11.292031 |
| min | -48.180000 |
| 25% | -15.272500 |
| 50% | -8.670000 |
| 75% | -0.120000 |
| max | 31.470000 |

810

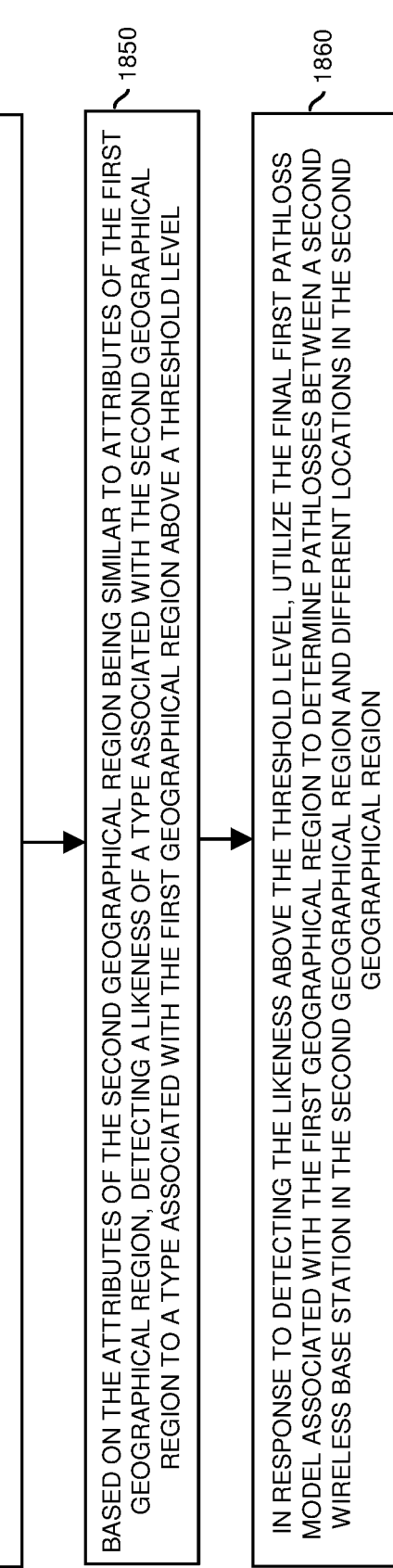

1800

1810 — RECEIVE A FIRST PRELIMINARY WIRELESS PATHLOSS MODEL, THE FIRST PRELIMINARY WIRELESS PATHLOSS MODEL INDICATING ANTICIPATED PATHLOSS BETWEEN A FIRST WIRELESS BASE STATION AND DIFFERENT LOCATIONS IN A FIRST GEOGRAPHICAL REGION

1820 — RECEIVE FEEDBACK GENERATED BY MULTIPLE WIRELESS STATIONS, THE FEEDBACK INDICATING ACTUAL PATHLOSS ASSOCIATED WITH THE WIRELESS STATIONS IN THE FIRST GEOGRAPHICAL REGION RECEIVING WIRELESS SIGNALS FROM THE FIRST WIRELESS BASE STATION

1830 — APPLY THE FEEDBACK TO THE FIRST PRELIMINARY PATHLOSS MODEL TO PRODUCE A FINAL FIRST PATHLOSS MODEL ASSOCIATED WITH THE FIRST GEOGRAPHICAL REGION

1840 — RECEIVE ATTRIBUTES OF A SECOND GEOGRAPHICAL REGION

1850 — BASED ON THE ATTRIBUTES OF THE SECOND GEOGRAPHICAL REGION BEING SIMILAR TO ATTRIBUTES OF THE FIRST GEOGRAPHICAL REGION, DETECTING A LIKENESS OF A TYPE ASSOCIATED WITH THE SECOND GEOGRAPHICAL REGION TO A TYPE ASSOCIATED WITH THE FIRST GEOGRAPHICAL REGION ABOVE A THRESHOLD LEVEL

1860 — IN RESPONSE TO DETECTING THE LIKENESS ABOVE THE THRESHOLD LEVEL, UTILIZE THE FINAL FIRST PATHLOSS MODEL ASSOCIATED WITH THE FIRST GEOGRAPHICAL REGION TO DETERMINE PATHLOSSES BETWEEN A SECOND WIRELESS BASE STATION IN THE SECOND GEOGRAPHICAL REGION AND DIFFERENT LOCATIONS IN THE SECOND GEOGRAPHICAL REGION

FIG. 18

| pathloss_dB | frequency_GHz | d_meters | EIRP | Calc_Signal_Strength |
|---|---|---|---|---|
| 66.43 | 2 | 25 | 47 | -19.43 |
| 71.53 | 2 | 45 | 47 | -24.53 |
| 74.73 | 2 | 65 | 47 | -27.73 |
| 77.06 | 2 | 85 | 47 | -30.06 |
| 78.89 | 2 | 105 | 47 | -31.89 |
| 80.41 | 2 | 125 | 47 | -33.41 |
| 81.70 | 2 | 145 | 47 | -34.70 |
| 82.82 | 2 | 165 | 47 | -35.82 |
| 83.81 | 2 | 185 | 47 | -36.81 |
| 84.71 | 2 | 205 | 47 | -37.71 |
| 85.51 | 2 | 225 | 47 | -38.51 |
| 86.25 | 2 | 245 | 47 | -39.25 |
| 86.94 | 2 | 265 | 47 | -39.94 |
| 87.57 | 2 | 285 | 47 | -40.57 |
| 88.16 | 2 | 305 | 47 | -41.16 |
| 88.71 | 2 | 325 | 47 | -41.71 |
| 89.23 | 2 | 345 | 47 | -42.23 |
| 89.72 | 2 | 365 | 47 | -42.72 |
| 90.18 | 2 | 385 | 47 | -43.18 |
| 90.62 | 2 | 405 | 47 | -43.62 |
| 91.04 | 2 | 425 | 47 | -44.04 |
| 91.44 | 2 | 445 | 47 | -44.44 |
| 91.82 | 2 | 465 | 47 | -44.82 |
| 92.19 | 2 | 485 | 47 | -45.19 |
| 92.54 | 2 | 505 | 47 | -45.54 |
| 92.87 | 2 | 525 | 47 | -45.87 |
| 93.20 | 2 | 545 | 47 | -46.20 |
| 93.51 | 2 | 565 | 47 | -46.51 |
| 93.81 | 2 | 585 | 47 | -46.81 |
| 94.11 | 2 | 605 | 47 | -47.11 |
| 94.39 | 2 | 625 | 47 | -47.39 |
| 94.66 | 2 | 645 | 47 | -47.66 |
| 94.93 | 2 | 665 | 47 | -47.93 |
| 95.18 | 2 | 685 | 47 | -48.18 |
| 95.43 | 2 | 705 | 47 | -48.43 |
| 95.68 | 2 | 725 | 47 | -48.68 |
| 95.91 | 2 | 745 | 47 | -48.91 |
| 96.14 | 2 | 765 | 47 | -49.14 |
| 96.37 | 2 | 785 | 47 | -49.37 |
| 96.59 | 2 | 805 | 47 | -49.59 |
| 97.01 | 2 | 845 | 47 | -50.01 |
| 97.21 | 2 | 865 | 47 | -50.21 |
| 97.41 | 2 | 885 | 47 | -50.41 |
| 97.60 | 2 | 905 | 47 | -50.60 |
| 97.79 | 2 | 925 | 47 | -50.79 |
| 97.98 | 2 | 945 | 47 | -50.98 |
| 98.16 | 2 | 965 | 47 | -51.16 |
| 98.34 | 2 | 985 | 47 | -51.34 |
| 98.51 | 2 | 1005 | 47 | -51.51 |

WIRELESS PATHLOSS MODELING AND DEPLOYMENT BASED ON FEEDBACK

BACKGROUND

Conventional wireless technology has been used for many years to connect wireless devices such as phones, laptops, etc., to a landline network and other wireless networks. Today, such wireless networks support many different types of connection services such as voice communications, cell communications, high-speed data services, Wi-Fi™ connectivity, and so on.

Cellular networks typically include a land area that has been divided into so-called cellular regions. A single base station typically resides in each cell. Often, the base station is connected to a landline network and supports communication with one or more wireless subscribers operating in a region covered by the cell. Accordingly, a wireless subscriber operating a cell phone in the cell is able to communicate with or have access to a landline network via a wireless link between the subscriber and a base station.

Conventional long-range cellular networks sometimes do not have the ability to provide connectivity to users at every location in a geographical region. One reason for this shortcoming is the high cost associated with designing and subsequently implementing a long-range cell tower for every portion of a geographical region. In many instances, a cell tower providing long-range coverage requires a long-term financial commitment. In certain instances, because costs are so high, a service provider may not even install a cell tower because it is not a good investment.

More recent wireless technology includes so-called pico base stations or Wi-Fi™ stations having the ability to provide short-range coverage compared to long-range coverage provided by conventional cell towers. Typically, the short-range base stations have the ability to provide coverage in locations that were not previously possible. As an example, a pico base station may provide radial coverage on the order of 200-300 meters. A long-range base station or conventional cell tower may provide wireless coverage on the order of a mile or more.

Because of cost concerns and higher re-usage of frequencies in the RF spectrum, it is now becoming more common to implement one or more pico base stations to provide additional wireless coverage in a region. Small cell base station deployment may increase the number of cells in a given area, and thereby, improve the overall network capacity without adding more RF spectrums. In certain cases, a short-range base station can be mounted to existing infrastructure (e.g., a cable), alleviating the costs associated with having to design and erect a dedicated tower.

BRIEF DESCRIPTION OF EMBODIMENTS

This disclosure includes the observation that, in any wireless network environment, propagation models may be calibrated using pre-existing CW (a.k.a., continuous wave) data set or pre-existing conditions. These propagation models are tuned based on corresponding transmitter specifications, antenna pattern, samples averaging as well as geo data. There is usually a gap of required specifications for CW transmitters (such as specific heights, azimuth, antennae, morphologies etc.) including inaccuracy in geodata set. Often such propagation models are validated using similar transmitters from other locations in the geographical region which provides reasonable results for model validation (mean error: 0 and standard deviation <7 dB).

After network design, when base stations are implemented and in service using specific frequencies, they typically will provide a larger (optimistic) or smaller (pessimistic) coverage radius (wireless coverage region or wireless footprint) than as originally predicted. There are multiple factors which can create this situation. For example, to calculate a number of needed radios and corresponding cost, it is desirable to have accurate predictions of needed wireless coverage, which leads to accurate radio count and coverage statistics. It is also desirable to have the field coverage footprint as per network design predictions in order to get the right user experience and hence the network profitability.

Thus, if predicted pathloss models are incorrect because they provide a larger wireless coverage region than expected or a smaller wireless coverage region than expected, then the wireless network may be implemented with too many wireless base station or too few wireless base stations. This results in an inefficient use of wireless resources to provide respective wireless network access services to corresponding mobile communication devices.

Techniques herein provide improved efficiency of wireless access networks and expand use of limited wireless bandwidth in a network environment.

More specifically, a communication management resource (a.k.a., configuration management resource) receives a first preliminary wireless pathloss model. The first preliminary wireless pathloss model indicates expected (anticipated) pathloss between a first wireless base station and different locations in a first geographical region. The communication management resource receives feedback generated by multiple wireless stations in the first geographical region. The feedback indicates actual pathloss associated with the wireless stations in the first geographical region receiving wireless signals from the first wireless base station. The communication management resource applies the feedback to the first preliminary pathloss model to produce an updated first pathloss model and eventually a final pathloss model associated with the first geographical region. Each iteration of the pathloss model results in a more accurate pathloss model for the first geographical region.

As its name suggests, the pathloss model can be configured to indicate a respective pathloss of a transmitted wireless signal versus distance with respect to a corresponding wireless station transmitting the wireless signal.

In one example, the feedback as discussed herein includes location information indicating locations of the wireless stations in the first geographical region. The feedback may further include power level information indicating wireless power levels at which one or more wireless signals are transmitted in the first geographical region and/or wireless power levels of one or more of the multiple wireless stations receiving the wireless signals from the first wireless base station. The communication management resource as discussed herein can be configured to utilize the location information and the power level information to determine, for each of the multiple different locations in the first geographical region, a respective pathloss between a corresponding location in the first geographical region and the first wireless base station. Via the feedback, the communication management resource adjusts a pathloss function (such as wireless signal attenuation versus distance of the signal traveled) associated with the preliminary pathloss model based on the respective pathlosses for the multiple different locations in the first geographical region.

In accordance with yet further examples, the communication management resource receives attributes of a second geographical region. Based on analysis of the attributes of the second geographical region, the communication management resource detects a match (such as substantial match in likeness) of a type associated with the second geographical region to a type associated with the first geographical region. In response to detecting the match as being above a threshold level, the communication management resource utilizes the updated pathloss model to determine pathlosses associated with the second geographical region because it is presumed to provide pathloss similar to the first geographical region. Based on the determined pathlosses associated with the second geographical region as indicated by the updated first pathloss model, the communication management resource selects a location in which to install a wireless base station in the second geographical region to provide mobile communication devices in the second geographical region access to a remote network through the second wireless base station.

Yet further, examples as discussed herein include the updated first pathloss model indicating pathloss versus distance with respect to the first wireless base station in the first geographical region.

Note further that the communication management resource can be configured to, based on multiple instances of receiving feedback, iteratively apply different instances of the feedback to the first wireless pathloss model to produce the updated first pathloss model. Each iteration of applying the feedback reduces an error associated with pathloss in the first geographical region as indicated by the updated first preliminary pathloss model.

In accordance with still further examples, a configuration management resource as discussed herein determines that a second geographical region is similar to the first geographical region. The configuration management resource can be configured to derive a distance value from the updated pathloss model associated with the first geographical region. The configuration management resource utilizes the distance value to implement (control) a spacing between one or more wireless base stations in the second geographical region.

Examples as discussed herein are useful over conventional techniques. For example, implementation of a configuration management resource and corresponding operations as discussed herein provides more efficient deployment of wireless networks and improved wireless coverage to provide wireless connectivity to different users.

Note that any of the resources as discussed herein can include one or more computerized devices, mobile communication devices, sensors, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including computer readable hardware storage on which software instructions are encoded for subsequent execution. The computer-readable storage hardware for storing instructions may be configured as a non-transitory computer-readable storage medium. The instructions, when executed in a computerized device (hardware) having a processor, program and/or cause the processor (hardware) to perform the operations disclosed herein.

Such arrangements are typically provided as software, code, instructions, and/or other data (e.g., data structures) arranged or encoded on computer-readable storage hardware such as a non-transitory computer readable storage medium such as an optical medium (e.g., CD-ROM), floppy disk, hard disk, memory stick, memory device, etc., or other medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes computer-readable storage hardware and/or system having instructions stored thereon. The instructions, when executed by the computer processor hardware, cause the computer processor hardware (such as one or more co-located or disparately processor devices or hardware) to: receive a first preliminary wireless pathloss model, the first preliminary wireless pathloss model indicating anticipated pathloss between a first wireless base station and different locations in a first geographical region; receive feedback generated by multiple wireless stations, the feedback indicating actual pathloss associated with the wireless stations in the first geographical region receiving wireless signals from the first wireless base station; apply the feedback to the first preliminary pathloss model to produce a final first pathloss model associated with the first geographical region; receive attributes of a second geographical region; based on the attributes of the second geographical region being similar to attributes of the first geographical region, detecting a likeness (such as match) of a type associated with the second geographical region to a type associated with the first geographical region above a threshold level; in response to detecting the likeness similarity of the second geographical region to the first geographical region above the threshold level, utilize the final first pathloss model associated with the first geographical region to determine pathlosses between a second wireless base station in the second geographical region and different locations of mobile communication devices in the second geographical region.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing improved wireless connectivity via efficient implementation of wireless base stations in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 7 is an example diagram illustrating distribution of samples per clutter classes as discussed herein.

FIG. 8 is an example diagram illustrating distribution of samples per location (such as cell center, cell edge, etc.) clutter classes as discussed herein.

FIG. 9 is an example diagram illustrating global statistics as discussed herein.

FIG. 18 is an example diagram illustrating a method according to embodiments herein.

FIG. 20 is an example chart illustrating pathloss versus distance and received signal strength as discussed herein.

Figure 1:
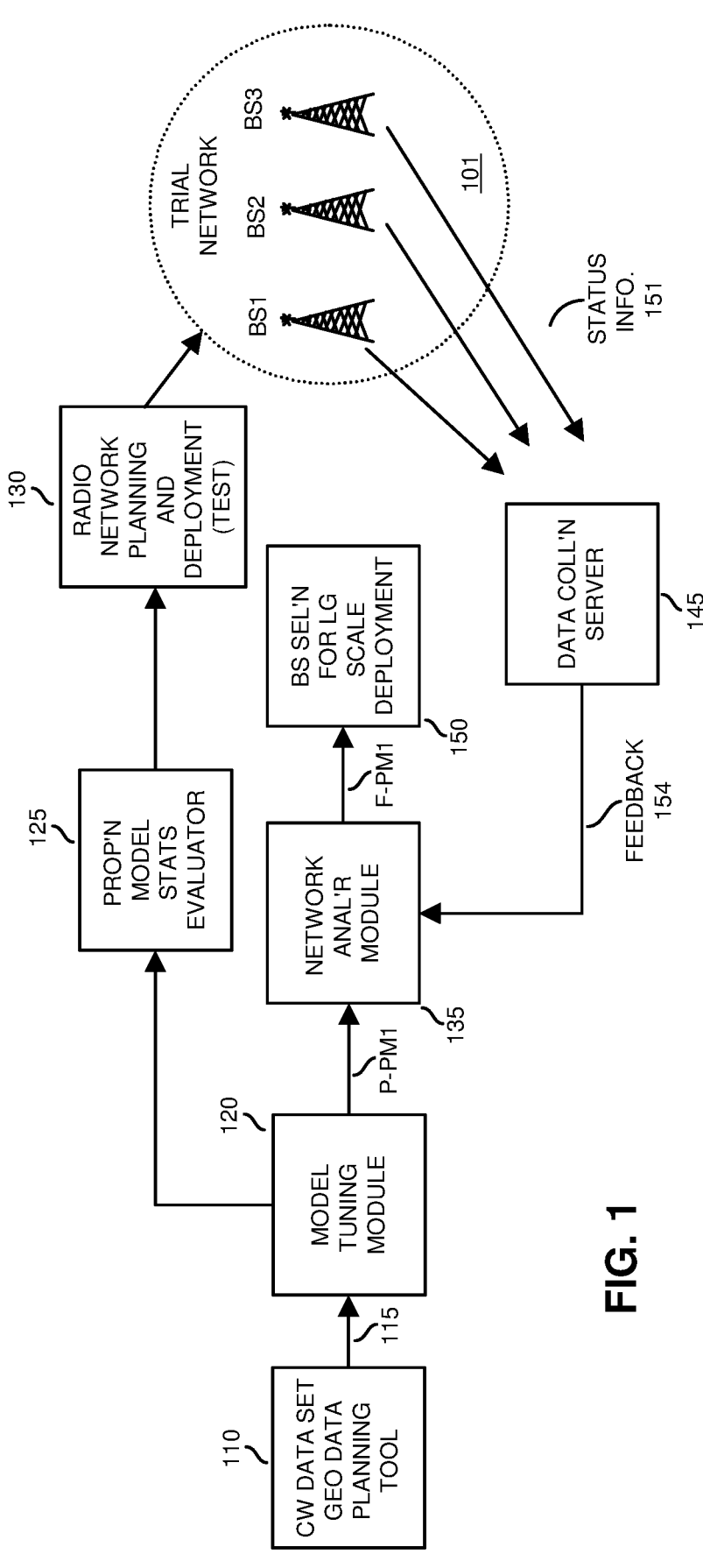
FIG. 1 is an example diagram illustrating implementation of a communication management system (such as a closed loop radio network modeling architecture) and related components as discussed herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DESCRIPTION OF EMBODIMENTS

This disclosure proposes a method for validating and fine-tuning propagation model predictions based on one or more field-measured datasets using field setup configuration as well as data collections from device measurements. Newly installed networks are typically designed with tuned propagation models using CW (Continuous Wave) test data; these designs are done based on several assumptions, i.e., link budget margins, geodata, and CW methodology, which often deviate from reality when these networks are deployed and often time require validation or re-tuning propagation models before designing entire markets (counties). The techniques as discussed herein propose to capture RF measurements from radiating radio base station PCI (Physical Cell ID) using scanners to measure signal strengths across a predefined channel bandwidth as well as data reporting from mobile devices using a respective service provider or wireless base station operators mobile application on the mobile communication devices. This data is then scrubbed for outliers and ingested for analysis between predicted and measured values for all measurement points. Mean error and Standard Deviation are the most critical factors used to evaluate prediction accuracy, and they will vary between morphology, necessitating the need to be derived by clutter classes.

The techniques as discussed herein (closed-loop Radio network modeling) improve the accuracy of network design by continuously adjusting model settings with the goal of improving design efficacy/profitability, i.e., over-predicted models (optimistic) will design an under-dimensioned network due to more extensive coverage footprint predictions while under-predicted models (pessimistic) will dimension more cell sites leading to higher net interference and deployment cost.

In one example as discussed herein, communication management hardware receives a first preliminary wireless pathloss model indicating expected pathloss between a first wireless base station and different locations in a first geographical region. Based on testing of pathloss in the first geographical region, the communication management hardware also receives feedback generated by multiple wireless stations. The feedback indicates actual pathloss associated with the wireless stations in the first geographical region receiving wireless signals from the first wireless base station. The communication management hardware iteratively applies the feedback to the first preliminary pathloss model to produce an updated first pathloss model associated with the first geographical region to produce a final more accurate pathloss model for the first geographical region. The communication management hardware repeats this process of producing a respective pathloss model for each of multiple different types of geographical regions. The pathloss models are then subsequently used to determine pathloss in environments similar to the tested geographical regions. The determined pathlosses for the different geographical regions is used as a basis to determine appropriate spacing of wireless base stations in newly implemented wireless networks. In other words, the chosen spacing between wireless base stations in the new wireless network is a function of the determined pathloss associated with the corresponding geographical region in which the wireless base stations are being installed.

FIG. 1 is an example diagram illustrating implementation of a communication management system (such as a closed loop radio network modeling architecture) and related components as discussed herein.

A radio (wireless signal) propagation model or so-called pathloss model as discussed herein describes the behavior of the wireless signal while it is transmitted from a transmitter to the receiver. The pathloss model (such as preliminary pathloss model P-PM1 or final pathloss model F-PM1) defines a relation between the distance of transmitter & receiver as well as an amount of path loss a wireless signal experiences as it travels in the geographical region. From this relation, as indicated by a respective pathloss model, one is able to determine the allowed path loss and the maximum cell range for a given wireless network of one or more wireless base stations.

Note that the term "propagation model" or pathloss model as discussed herein means a mathematical formulation for the characterization of radio (wireless) wave propagation as a function of frequency, distance, and/or other conditions. Such propagation or pathloss models are used for coverage predictions in a wireless communications network.

Note that existing default propagation models need to be tuned with reference to specific network requirements such as frequency band, radio heights, specific pathlosses and environment. In order to tune the propagation model via model tuning module 120, there is a desire to have planning tool 110, CW (a.k.a., Continuous Wave) measured dataset, geographical data (such as clutter height, height, and clutter classes). Such propagation models as discussed herein can be being characterized as per the given measurements from one or more CW dataset (not from actual network deployment characteristics). For example, a radio antenna mount will be different compared to CW transmitter setup, which may be used for model tuning before network deployed. Antenna height will be different than the CW transmitter antenna height. Transmit Power, receiver noise, speed, type of geographical environment, etc., can be different then earlier assumptions.

As shown in FIG. 1, the model tuning module 120 is configured to tune such preliminary pathloss models 115. Given models statistics may be with 0 dB in mean error and ~7 dB in standard deviation. The preliminary pathloss model (a.k.a., wireless signal propagation model) will be used for trial network 101 and base station location selection. In accordance with one example, such trial base stations in network 101 will have a defined technology deployment with an appropriate transmit power as defined by radio vendors including all given parameters as per golden values specified. Such trial base stations will be deployed in each of multiple different types of environments (test geographical regions such as city with large buildings and flat terrain, hilly terrain with tall trees, flat urban area with high density of homes less than 50 feet in height, and so on).

As discussed herein, it is desirable to measure the accuracy of a given model with reference to trial network base stations which will reflect the user perceived signal strength (coverage).

For example, tool 110 provides attributes of a respective wireless network type to the model tuning module 120. The model tuning module creates a respective preliminary pathloss model P-PM1. The evaluator 125 provides notification to the resource 130, which generates a respective test plan for testing pathloss in the wireless network 101. The test plan may include configuring the wireless stations in the network environment 101 to support collection and distribution of location information and power measurement information. The resource 130 communicates the test plan to the corresponding wireless stations (such as base station BS1, base station BS2, base station BS3, mobile communication device M1, mobile communication device M2, mobile communication device M3, etc.) in the wireless network 101.

The wireless stations execute the test plan and forward corresponding status information 151 (such as feedback) to the data collection server 145. The data collection server 145 forwards the received status information 151 as feedback 154 (such as actual detected pathlosses associated with transmitted wireless signals in the wireless network 101) to the network analyzer module 135. The network analyzer module 135 uses the received feedback and actual pathloss measurements to adjust the received preliminary pathloss model P-PM1 to produce pathloss model F-PM1 (updated pathloss model more accurately indicating pathloss in the geographical region associated with network 101). The management resource 150 uses the received pathloss model F-PM1 to implement appropriate spacing of wireless base stations in one or more new wireless networks that are of the same type as wireless network 101. In other words, as previously discussed, the accurate pathloss as specified by the pathloss model F-PM1 provides a basis in which to determine appropriate spacings of wireless base stations in a new wireless network of the same geographical region type as wireless network 101.

Figure 2:
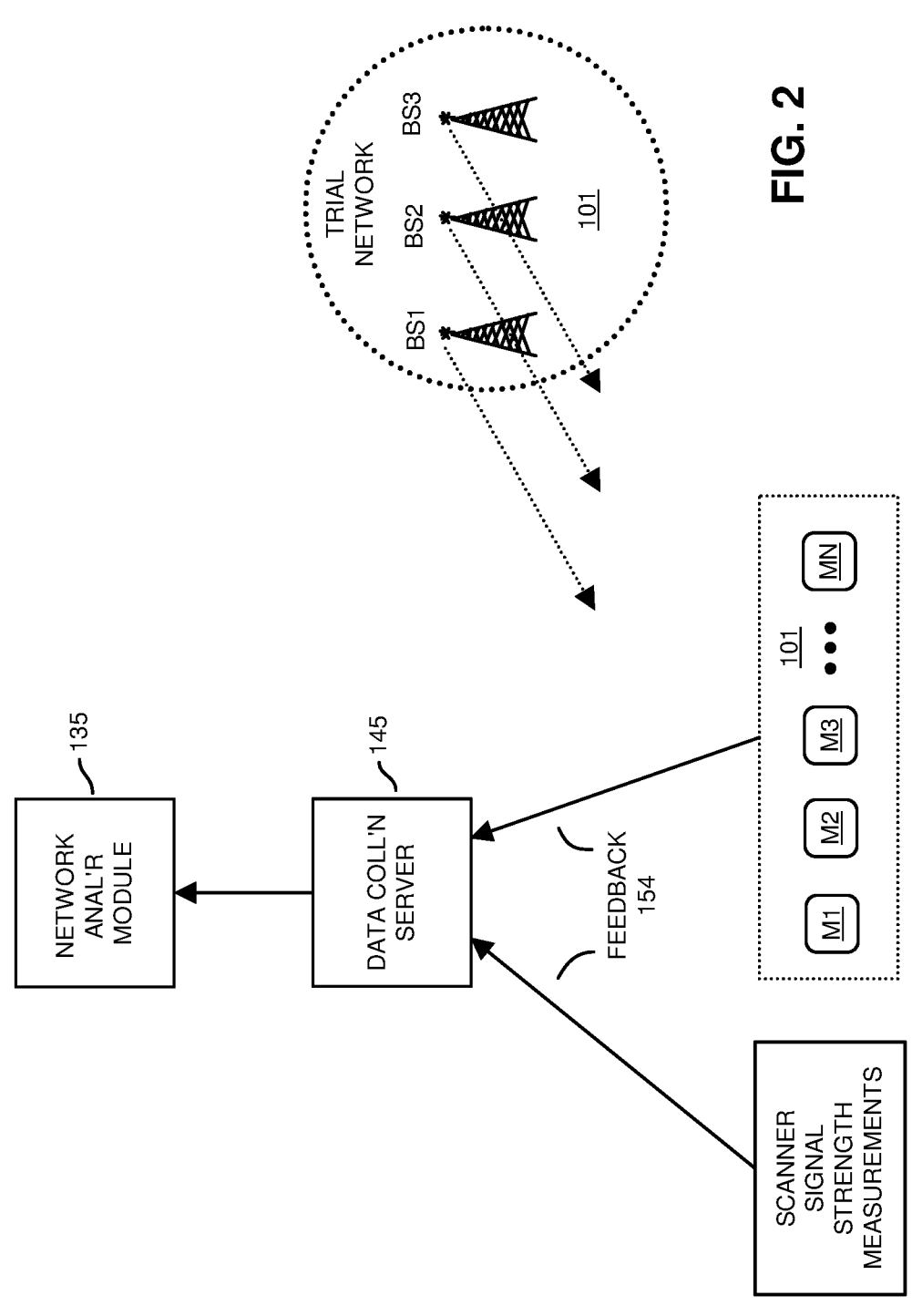
FIG. 2 is an example diagram illustrating implementation of a communication management system and related components (such as trial base stations and data collection from mobile communication devices) as discussed herein.

FIG. 2 is an example diagram illustrating implementation of a communication management system and related components (such as trial base stations and data collection from mobile communication devices) as discussed herein.

As shown in FIG. 2, the setup of data collection server is responsible to collect the measurement datasets from users. Such devices (wireless stations such as wireless base stations, mobile communication devices, etc.) will be reporting to collection server 145 based on carriers mobile applications executed in each of the mobile communication devices M1, M2, M3, etc. Each of the mobile communication devices M1, M2, M3, etc., report information such as their location, physical cell id of the base station transmitting a respective signal measured by the mobile communication device, measured signal strength of received wireless signals from the wireless base station with a respective physical cell ID, etc. Such data collection can also be achieved by implementing drive testing in the field with scanner measurement setup to capture physical cell id and signal strength measured of corresponding wireless base stations transmitting wireless signals in the wireless network 101.

In one configuration, scanner setup will be present in the drive testing vehicles or field operations vehicle where the scanner will collect the measurement and upload such measurements to the data collection server.

Users and corresponding mobile communication devices M1, M2, etc., will be distributed across trial base stations). Each user will have mobile application which will collect the coverage (signal strength), location (lat/long) and physical cell id of the serving base station. In other words, the wireless signals from the wireless base stations include a respective identity value indicating the wireless base station transmitting the wireless signal. This allows the determination of pathloss between a wireless base station transmitting a wireless signal and the mobile communication device receiving the wireless signal.

Users and scanner data collection will be reported to data collection module which will be accessible by network analyzer.

The distribution of the mobile communication device M1, M2, etc., on the wireless network 101 may vary.

Yet further, network analyzer can be configured to post process such data received from collection module. Post processing may be more extensive than described below.

1. Samples averaging using 40λ where λ depends on frequency
2. Duplicate samples removal
3. Data scrubbing with multiple incorrect physical cell ids reporting
4. Invalid latitude/longitude removal
5. Breakup of measurements per morphologies (urban, sub urban, dense urban etc.)

Still further, final measured dataset may be used to compare the predicted signal strength from the tuned propagation model which was used for base station selection algorithm. Network analyzer will generate following statistics (see at least FIGS. 3-9) based on the received measurement dataset including the filtering data set as per the network cell edge pathloss signal strength.

Figure 3:
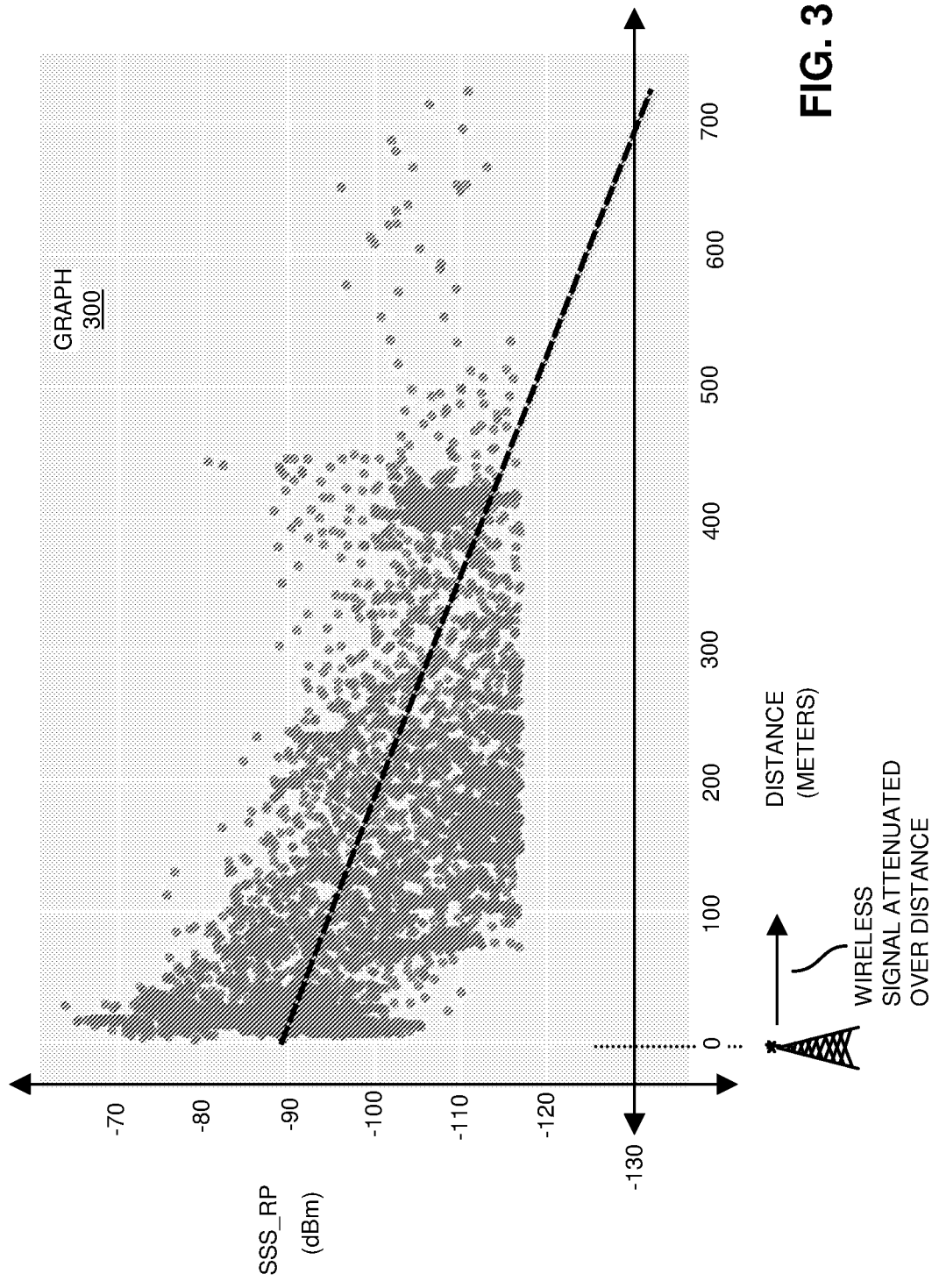
FIG. 3 is an example diagram illustrating measured signal strength of wireless signals versus distance as discussed herein.

FIG. 3 is an example diagram illustrating measured signal strength of wireless signals versus distance as discussed herein.

Figure 4:
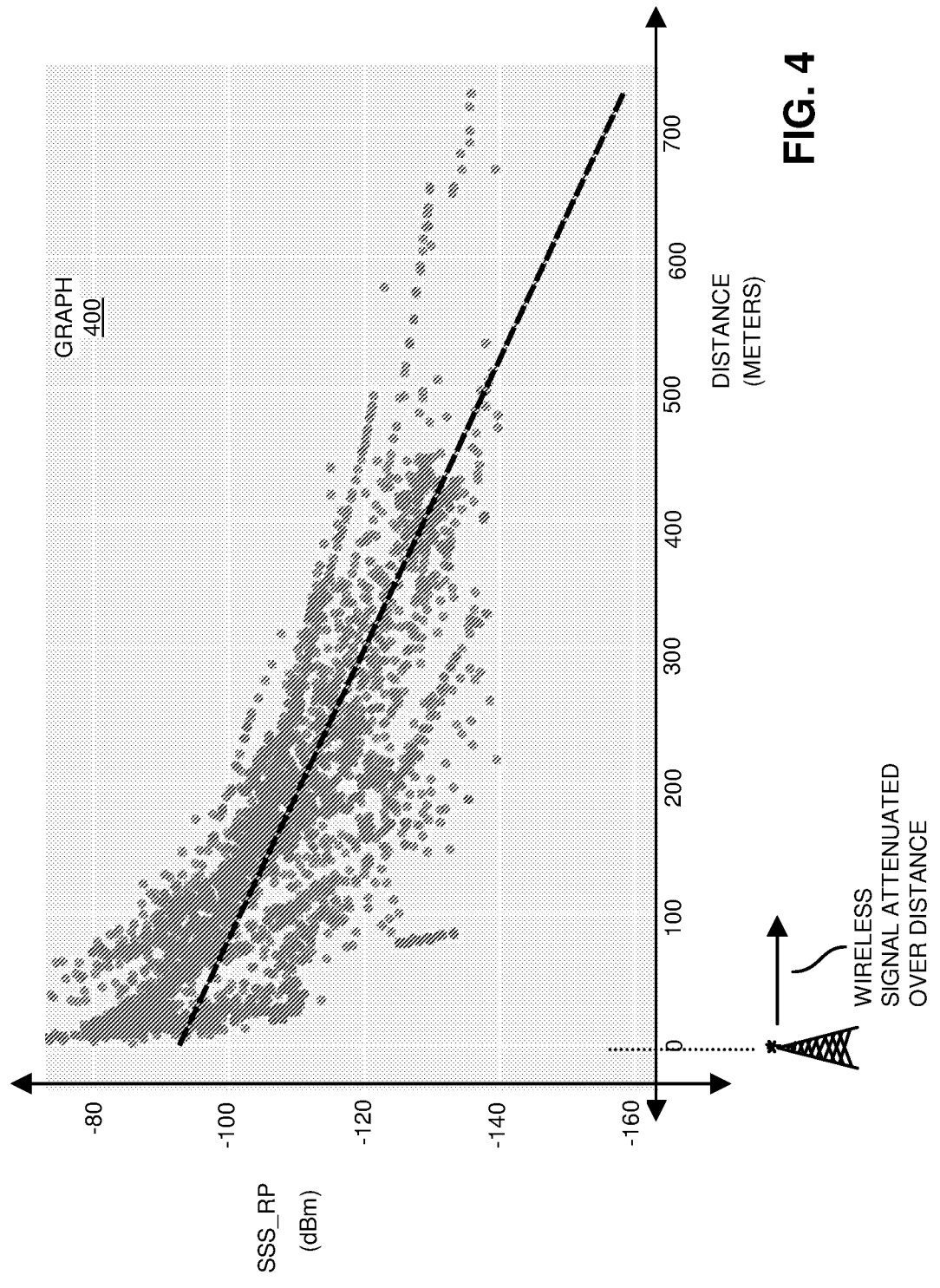
FIG. 4 is an example diagram illustrating predicted signal strength of wireless signals versus distance as discussed herein.

FIG. 4 is an example diagram illustrating predicted signal strength of wireless signals versus distance as discussed herein.

Figure 5:
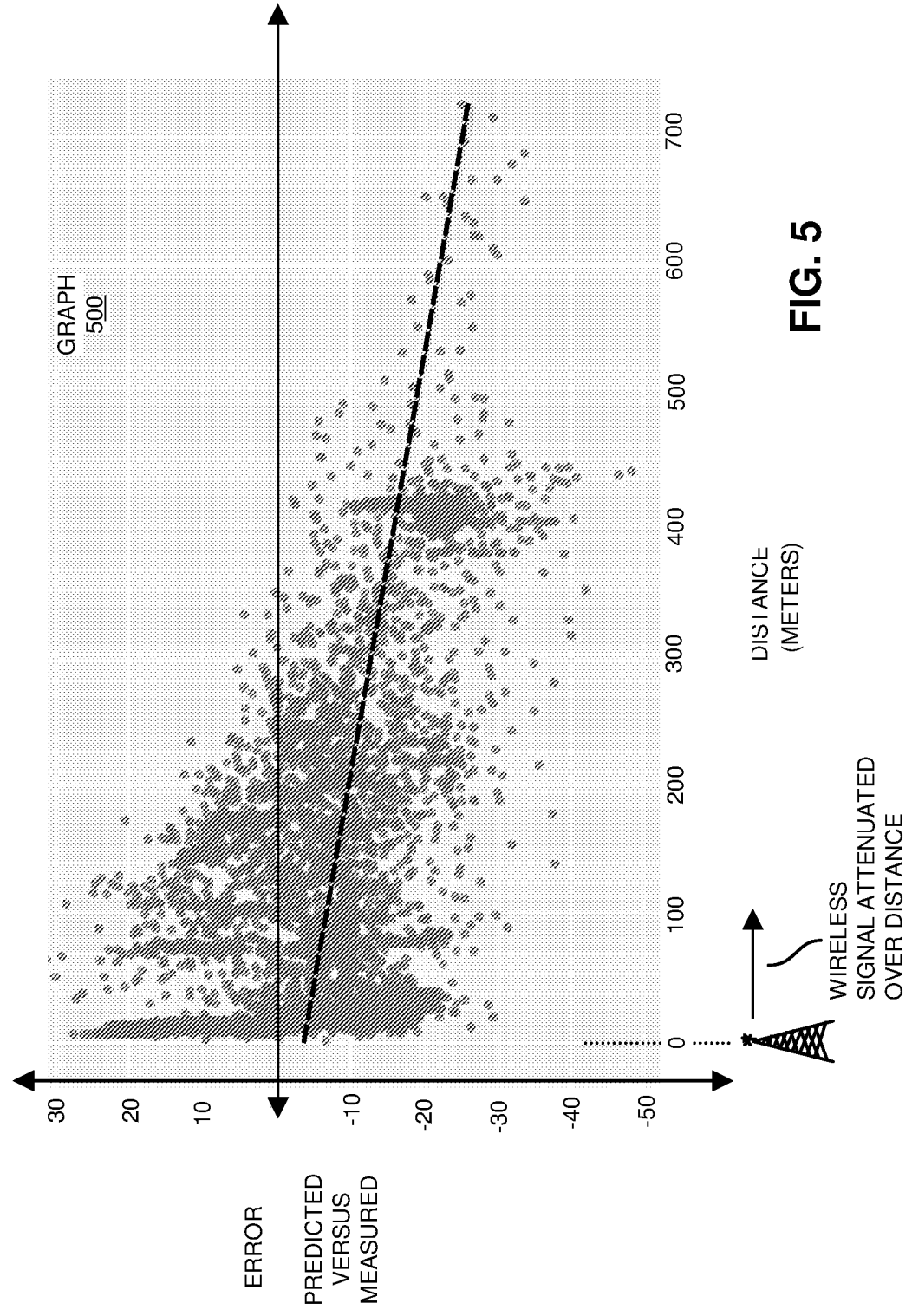
FIG. 5 is an example diagram illustrating error associated with predicted versus measurement distribution per distance as discussed herein.

FIG. 5 is an example diagram illustrating error associated with predicted versus measurement distribution per distance as discussed herein.

Figure 6:
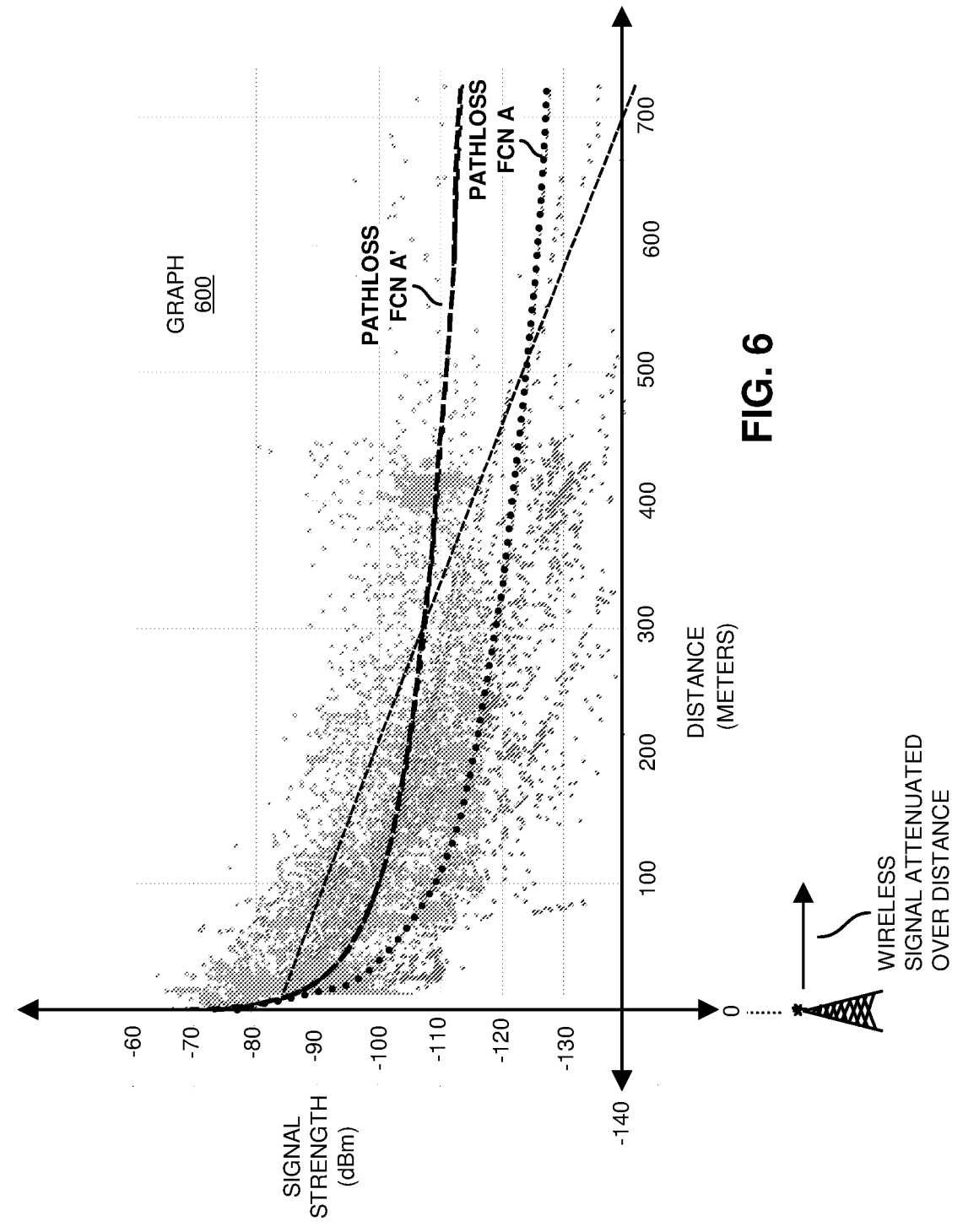
FIG. 6 is an example diagram illustrating consolidated signal strength (measured versus predicted) versus distance as discussed herein.

FIG. 6 is an example diagram illustrating consolidated signal strength (measured versus predicted) versus distance as discussed herein.

Graph 600 indicates that adjustments are necessary to accommodate user perceived signal strength in the propagation model. Function A represents an original anticipated pathloss versus distance. The feedback is used to update the prelim pathloss model such the final pathloss model as captured by function A' provides a more accurate depiction of pathloss versus distance with respect to a wireless station transmitting a wireless signal in a geographical region.

FIG. 7 is an example diagram illustrating distribution of samples per clutter classes as discussed herein.

FIG. 8 is an example diagram illustrating distribution of samples per location (such as cell center, cell edge, etc.) clutter classes as discussed herein.

FIG. 9 is an example diagram illustrating global statistics as discussed herein.

Figure 10:
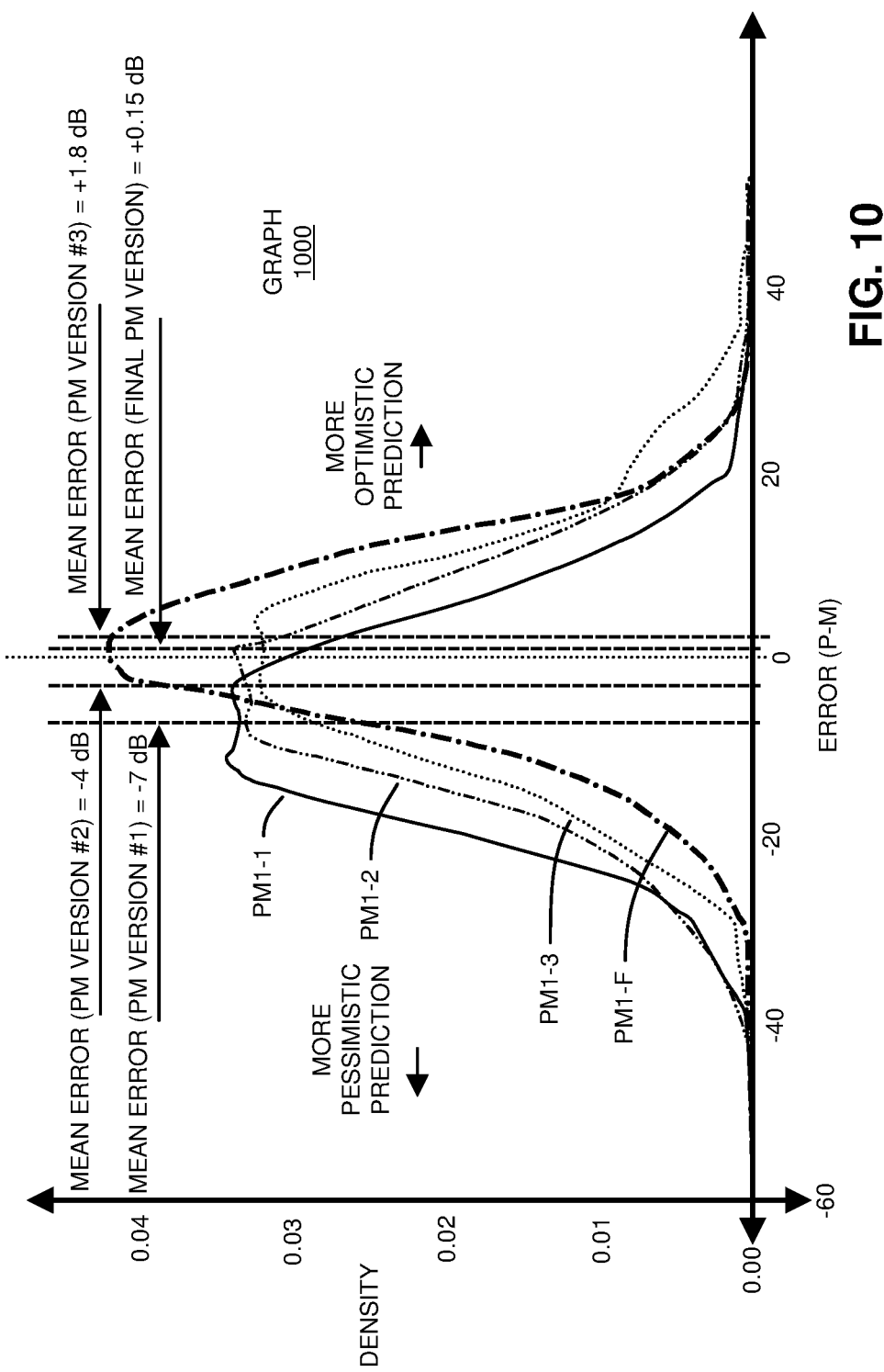
FIG. 10 is an example diagram illustrating (predicted-measured) error versus density as discussed herein.

FIG. 10 is an example diagram illustrating (predicted-measured) error versus density as discussed herein.

In this example, graph 1000 illustrates density versus error (Predicted versus Measured). As shown, the initial version #1 (PM1-1) of the corresponding pathloss model for a respective first geographical region under test has the highest error while each successive version #2 (PM1-2), version #3 (PM1-3), of the pathloss model to the final version (PM1-F) of the pathloss model experiences a reduction in error associated with the respective model. In other words, the testing of the different types of environments and application of actual pathloss feedback information results in modification of the corresponding initial inaccurate pathloss model so that the final version of the pathloss model it is more accurate. The more accurate pathloss model can be used to determine locations to install wireless base stations in a wireless network in another geographical region of similar type as the first geographical region for which the final version of the pathloss model is generated.

Figure 11:
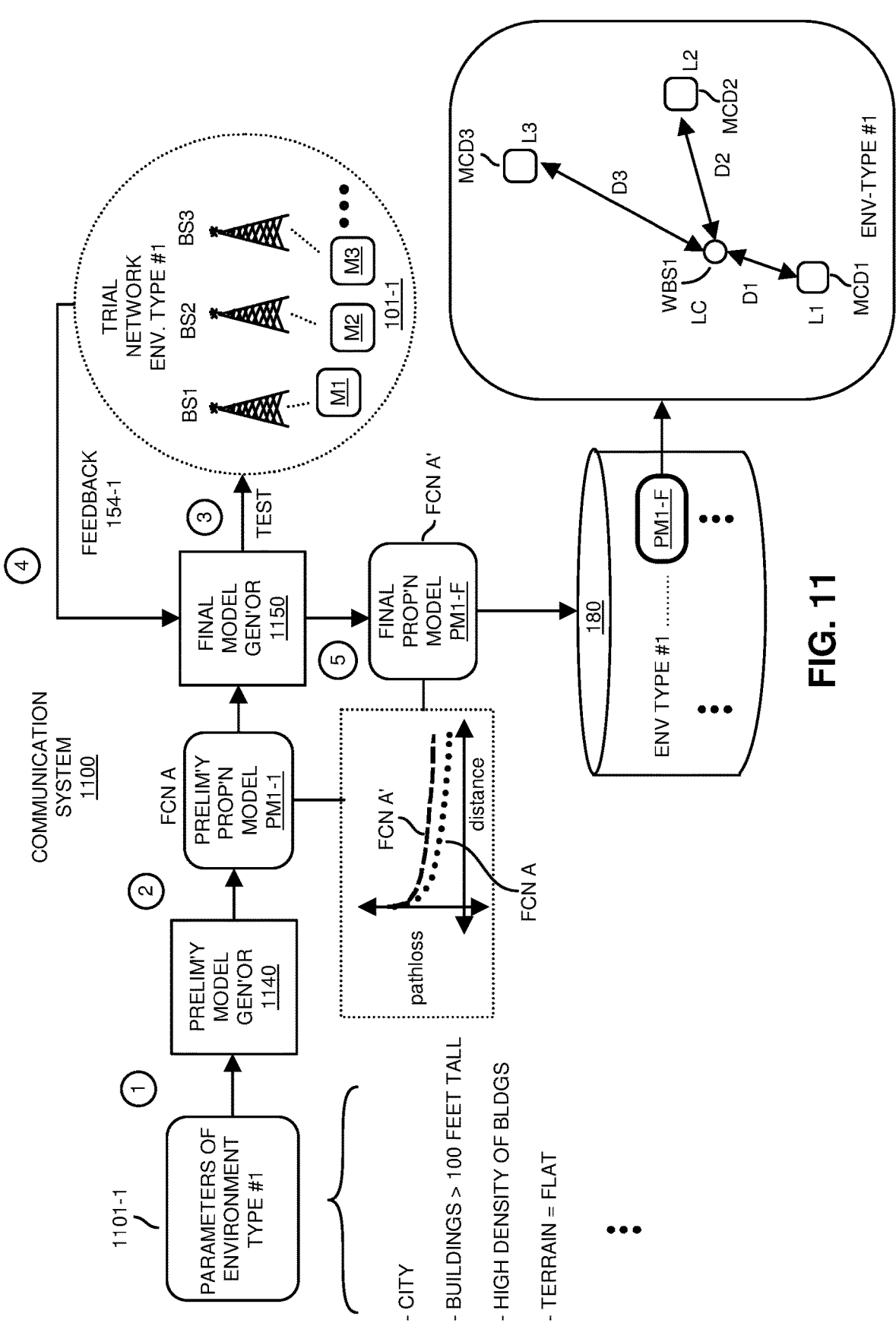
FIG. 11 is an example diagram illustrating refinement of a first pathloss model associated with a first environment type based on corresponding pathloss feedback information collected from multiple wireless stations as discussed herein.

FIG. 11 is an example diagram illustrating refinement (adjustment, modification, etc.) of a first pathloss model associated with a first environment type based on corresponding pathloss feedback information collected from multiple wireless stations as discussed herein.

In this example, the communication system 1100 as discussed herein includes preliminary model generator 1140, final model generator 1150, repository 180, trial network environment type #1 (including base station BS1, base station BS2, base station BS3, . . . , mobile communication device M1, mobile communication device M2, mobile communication device M3, . . . ), and so on.

Note that each of the resources as discussed herein can be implemented as hardware, executed software, or a combination of hardware and executed software. For example, the preliminary model generator 140 can be configured as preliminary model generator hardware, preliminary model generator software, or combination of preliminary model generator hardware and preliminary model generator software; the communication system 1100 can be configured as communication hardware, communication software, or combination of communication hardware and communication software; the final model generator 1150 can be configured as final model generator hardware, final model generator software, or a combination of final model generator hardware and a final model generator software; configuration management resource can be configured as configuration management hardware, configuration management software, or a combination of configuration management hardware and configuration management software; communication management resource can be implemented as communication management hardware, communication management software, or combination of communication management hardware and communication management software; and so on.

Further in this example, in processing operation #1, the preliminary model generator 1140 receives parameters indicating attributes of the first type of network environment 101-1 under test. For example, the attributes as specified by the parameters 1101-1 indicate that the environment type #1 is located in a city having: i) buildings greater than 100 feet in height, ii) buildings of density generally greater than 1 per acre, iii) generally flat terrain deviating less than 10 feet in height in a corresponding geographical region occupied by network environment 101-1, etc.

Based on the received parameters, in processing operation #2, the preliminary model generator 1140 produces the preliminary propagation model PM1-1 (pathloss or attenuation of a wireless signal versus distance propagated from a respective base station) as indicated by the function FCN A. The preliminary propagation model PM1-1 is a best guess as to pathloss associated with one or more wireless signals transmitted by respective wireless stations in the network environment 101-1 based on the received attributes.

The preliminary model PM1-1 may not be accurate. For example, actual attenuation and/or pathloss in the network environment 101-1 may be different than as indicated by the preliminary model PM1-1.

As further discussed below, examples herein include testing of the environment 101-1 (type #1) to determine actual pathlosses associated with signals wirelessly transmitted from the one or more wireless base stations to the mobile communication devices or actual wireless pathlosses associated with signals wirelessly transmitted from the mobile communication devices to the wireless base stations.

More specifically, in processing operation #3, the final model generator 1150 or other suitable entity provides notification of test operations associated with the wireless stations (such as base station BS1, base station BS2 . . . , mobile communication device M1, mobile communication device M2, etc.) in which wireless stations in the network environment 101-1 collect and provide feedback associated with transmitted wireless signals as well as received wireless signals.

In processing operation #4 (such as pathloss testing in wireless network 101-1), the wireless stations in wireless network environment 101-1 communicate with each other via wireless signals. The wireless base stations track a power level of wirelessly transmitting signals to the mobile communication devices; the mobile communication devices track a magnitude of the wireless signals received from the wireless base stations. If desired, the mobile communication devices track a magnitude of the wireless signals transmitted to the wireless base stations; the wireless base stations track a power level of wirelessly receiving signals from the mobile communication devices.

The feedback 154-1 from the wireless base stations and mobile communication devices in network environment 101-1 indicates information such as: i) a wireless power level of the wireless base station BS1 transmitting a first wireless signal to the mobile communication device M1, ii) a wireless power level of the mobile communication device M1 receiving the transmitted first wireless signal, iii) location of the wireless base station BS1, iv) location of the mobile communication device M1.

The final model generator 1150 uses the received feedback 154-1 to determine a respective actual path loss between the wireless base station BS1 and the mobile communication device M1. The final model generator 1150 then uses the respective feedback and determined actual path loss between the wireless base station BS1 and the mobile communication device M1 and calculated distance between the wireless base station BS1 and mobile communication device M1 (based on a difference or distance between the location of the base station BS1 and the location of the mobile communication device M1) as a basis in which to update the corresponding received preliminary model PM1-1 so that it is more accurate to determine pathloss.

Accordingly, each iteration and update of the preliminary model PM1-1, PM1-2, PM1-3, and so on, to the final model PM1-F (pathloss or attenuation versus distance from base station as indicated by the function FCN A') provides a better or more accurate indication of path loss (such as wireless signal attenuation) between a wireless base station and a mobile communication device in the type #1 network environment.

Further, in processing operation #4 (based on pathloss testing), the feedback 154-1 from the wireless base stations and mobile communication devices in network environment 101-1 indicates information such as: i) a wireless power level of the wireless base station BS1 transmitting a second wireless signal to the mobile communication device M2, ii) a wireless power level of the mobile communication device M2 receiving the second wireless signal, iii) location of the wireless base station BS1, iv) location of the mobile communication device M2.

The final model generator 1150 uses this received feedback 154-1 to determine a respective actual path loss between the wireless base station BS1 and the mobile communication device M2. The final model generator 1150 uses the respective feedback and determined actual path loss between the wireless base station BS1 and the mobile communication device M2 and calculated distance between the wireless base station BS1 and mobile communication device M2 (based on a difference or distance between the location of the base station BS1 and the location of the mobile communication device M2) as a basis in which to update the corresponding received preliminary model PM1-1.

Yet further, in processing operation #4 (based on pathloss testing), the feedback 154-1 from the wireless base stations and mobile communication devices in network environment 101-1 indicates information such as: i) a wireless power level of the wireless base station BS1 transmitting a third wireless signal to the mobile communication device M3, ii) a wireless power level of the mobile communication device M3 receiving the third wireless signal, iii) location of the wireless base station BS1, iv) location of the mobile communication device M3.

The final model generator 1150 uses the received feedback 154-1 as above to determine a respective actual path loss between the wireless base station BS1 and the mobile communication device M3. For example, the final model generator 1150 uses the respective feedback and determined actual path loss between the wireless base station BS1 and the mobile communication device M3 and calculated distance between the wireless base station BS1 and mobile communication device M3 (based on a difference or distance between the location of the base station BS1 and the location of the mobile communication device M3) as a basis in which to update the corresponding received preliminary model PM1-1.

Accordingly, each iteration and update of the preliminary model PM1-1 towards the final model PM1-F provides a better or more accurate indication of path loss (such as wireless signal attenuation) between a wireless base station and a mobile communication device in the type #1 network environment.

This iterative process of testing the respective network environment 101-1 and receiving respective feedback 154-1 ensures that each updated version of the pathloss model PL1 associated with environment type #1 is successively more accurate such that it properly or better reflects pathloss and corresponding attenuation of wireless signals transmitted in the network environment 101-1. Knowing the pathloss to higher degree of accuracy in the network environment type #1 (and other geographical regions of the same type #1 environment) is desirable because it enables more efficient use of the wireless bandwidth to communicate in the network environment 101-1. For example, the pathloss information or propagation information as indicated by the respective final (pathloss or propagation) model PM1-F enables a respective wireless station in a respective geographical region of the corresponding type #1 of network environment 101-1 (type #1) to determine what signal strength is needed to communicate to a target wireless station in the network environment. Further, the pathloss models as discussed herein can be used to determine wireless base station spacing in new wireless network environments.

In processing operation #5, the final model generator 1150 produces the final model PM1-F for storage in the repository 180. The repository 180 provides a respective mapping between the environment type #1 and the corresponding final model PM1-F. As further shown in FIG. 11, the model PM1-F can be used to determine a respective path loss between wireless stations presence in any network environments of type #1. For example, via the corresponding final model PM1-F, the corresponding communication management entity can be configured to determine a respective path loss between the wireless base station WBS1 at location L1 and any of the corresponding mobile communication devices. More specifically, via the final model PM1-F, a respective communication management entity determines the pathloss between wireless base station WBS1 and mobile communication device MCD1 at location L1 as pathloss PL1; via the final model PM1-F, a respective communication management entity determines the pathloss between wireless base station WBS1 and mobile communication device MCD2 at location L2 as pathloss P2; via the final model PM1-F, a respective communication management entity determines the pathloss between wireless base station WBS1 and mobile communication device MCD3 at location L3 as pathloss PL3; and so on.

Figure 12:
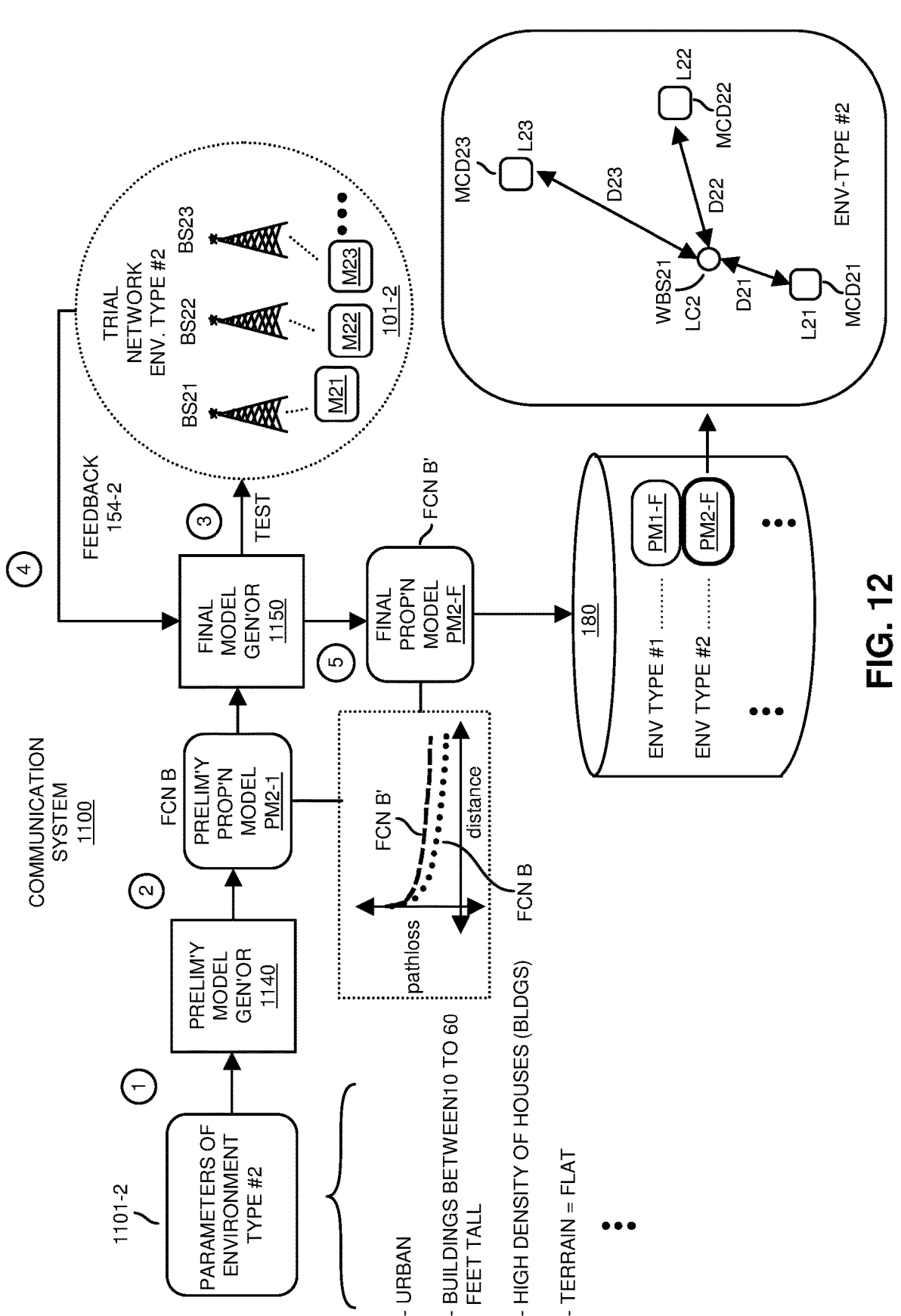
FIG. 12 is an example diagram illustrating refinement of a second pathloss model associated with a second environment type based on corresponding pathloss feedback information collected from multiple wireless stations as discussed herein.

FIG. 12 is an example diagram illustrating refinement of a second pathloss model associated with a second environment type based on corresponding pathloss feedback information collected from multiple wireless stations as discussed herein.

In this example, the communication system 1100 as discussed herein includes preliminary model generator 1140, final model generator 1150, repository 180, trial network environment type #2 (including base station BS21, base station BS22, base station BS23, . . . mobile communication device M21, mobile communication device M22, mobile communication device M23, . . . ), and so on.

Further in this example, in processing operation #1, the preliminary model generator 1140 receives parameters indicating attributes of the second type of network environment 101-2 (type #2). For example, the attributes as specified by the parameters 1101-2 indicate that the environment type #2 is located in an urban area having: i) buildings such as homes between 10 and 60 feet in height, ii) buildings (such as houses) of density greater than 3 per acre, iii) generally flat terrain deviating less than 10 feet in height in a corresponding geographical region occupied by network environment 101-2, etc.

Based on the received parameters, in processing operation #2, the preliminary model generator 1140 produces the preliminary propagation model PM2-1 (pathloss or signal attenuation versus distance from base station) as indicated by the function FCN B. The preliminary propagation model PM2-1 is a best guess as to pathloss associated with one or more wireless signals transmitted by respective wireless stations in the network environment 101-2 based on the received attributes.

The preliminary model PM2-1 may not be accurate. For example, actual attenuation and/or pathloss in the network environment 101-2 may be different than as indicated by the preliminary model PM2-1.

As further discussed below, examples herein include testing of the environment 101-2 (type #2) to determine actual pathlosses associated with signals wirelessly transmitted from the one or more wireless base stations to the mobile communication devices or actual wireless pathlosses associated with signals wirelessly transmitted from the mobile communication devices to the wireless base stations.

More specifically, in processing operation #3, the final model generator 1150 provides notification of test operations associated with the wireless stations (such as base station BS21, base station BS22, . . . , mobile communication device M21, mobile communication device M22, etc.) in which wireless stations in the network environment 101-2 provide feedback associated with transmitted wireless signals as well as received wireless signals.

In processing operation #4 (such as pathloss testing), the wireless stations in wireless network environment 101-2 communicate with each other via wireless signals. The wireless base stations track a power level of wirelessly transmitting signals to the mobile communication devices; the mobile communication devices track a magnitude of the wireless signals received from the wireless base stations. If desired, the mobile communication devices track a magnitude of the wireless signals transmitted to the wireless base stations; the wireless base stations track a power level of wirelessly receiving signals from the mobile communication devices.

The feedback 154-1 from the wireless base stations and mobile communication devices in network environment 101-2 indicates information such as: i) a wireless power level of the wireless base station BS21 transmitting a first wireless signal to the mobile communication device M21, ii) a wireless power level of the mobile communication device M21 receiving the first wireless signal, iii) location of the wireless base station BS21, iv) location of the mobile communication device M21. The final model generator 1150 uses the received feedback 154-1 to determine a respective actual path loss between the wireless base station BS21 and the mobile communication device M21. The final model generator 1150 then uses the respective feedback and determined actual path loss between the wireless base station BS21 and the mobile communication device M21 and calculated distance between the wireless base station BS21 and mobile communication device M21 (based on a difference or distance between the location of the base station BS21 and the location of the mobile communication device M21) as a basis in which to update the corresponding received preliminary model PM2-1 so that it is more accurate to determine pathloss.

Accordingly, each iteration and update of the preliminary model PM2-1 to the final model PM2-F (pathloss or attenuation versus distance from base station as indicated by the function FCN B') provides a better or more accurate indication of path loss (such as wireless signal attenuation) between a wireless base station and a mobile communication device in the type #2 network environment.

Further, in processing operation #4 (based on pathloss testing), the feedback 154-2 from the wireless base stations and mobile communication devices in network environment 101-2 indicates information such as: i) a wireless power level of the wireless base station BS21 transmitting a second wireless signal to the mobile communication device M22, ii) a wireless power level of the mobile communication device M22 receiving the second wireless signal, iii) location of the wireless base station BS21, iv) location of the mobile communication device M22.

The final model generator 1150 uses the received feedback 154-1 to determine a respective actual path loss between the wireless base station BS21 and the mobile communication device M22. The final model generator 1150 uses the respective feedback and determined actual path loss between the wireless base station BS21 and the mobile communication device M22 and calculated distance between the wireless base station BS21 and mobile communication device M22 (based on a difference or distance between the location of the base station BS21 and the location of the mobile communication device M22) as a basis in which to update the corresponding received preliminary model PM2-1.

Yet further, in processing operation #4 (based on pathloss testing), the feedback 154-1 from the wireless base stations and mobile communication devices in network environment 101-2 indicates information such as: i) a wireless power level of the wireless base station BS21 transmitting a third wireless signal to the mobile communication device M23, ii) a wireless power level of the mobile communication device M23 receiving the third wireless signal, iii) location of the wireless base station BS21, iv) location of the mobile communication device M23.

The final model generator 1150 uses the received feedback 154-1 to determine a respective actual path loss between the wireless base station BS21 and the mobile communication device M23. The final model generator 1150 uses the respective feedback and determined actual path loss between the wireless base station BS21 and the mobile communication device M23 and calculated distance between the wireless base station BS21 and mobile communication device M23 (based on a difference or distance between the location of the base station BS21 and the location of the mobile communication device M23) as a basis in which to update the corresponding received preliminary model PM2-1.

Accordingly, each iteration and update of the preliminary model PM2-1 towards the final model PM2-F based on feedback 154-2 provides a better or more accurate indication of path loss (such as wireless signal attenuation) between a wireless base station and a mobile communication device in the type #2 network environment.

This iterative process of testing the respective network environment 101-2 and receiving respective feedback 154-2 ensures that each updated version of the pathloss model PL2 associated with environment type #2 is successively more accurate such that it properly or better reflects pathloss and corresponding attenuation of wireless signals transmitted in the network environment 101-2. Knowing the pathloss to higher degree of accuracy in the network environment type #2 (and other geographical regions of the same type #2 environment) is desirable because it enables more efficient use of the wireless bandwidth to communicate in the network environment 101-2. For example, the pathloss information or propagation information as indicated by the respective final (pathloss or propagation) model PM2-F enables a respective wireless station in a respective geographical region of the corresponding type #2 of network environment 101-2 (type #2) to determine what signal strength is needed to communicate to a target wireless station in the network environment.

In processing operation #5, the final model generator 1150 produces the final model PM2-F for storage in the repository 180. The repository 180 provides a respective mapping between the environment type #2 and the corresponding final model PM2-F.

As further shown in FIG. 12, the model PM2-F can be used to determine a respective path loss between wireless stations presence in network environments of type #2. For example, via the corresponding final model PM2-F, the corresponding communication management entity can be configured to determine a respective path loss between the wireless base station WBS21 at location L21 and any of the corresponding mobile communication devices. More specifically, via the final model PM2-F, a respective communication management entity can be configured to determine the pathloss between wireless base station WBS21 and mobile communication device MCD21 at location L21 as pathloss PL21; via the final model PM2-F, a respective communication management entity determines the pathloss between wireless base station WBS21 and mobile communication device MCD22 at location L22 as pathloss P22; via the final model PM2-F, a respective communication management entity determines the pathloss between wireless base station WBS21 and mobile communication device MCD23 at location L23 as pathloss PL23; and so on.

Figure 13:
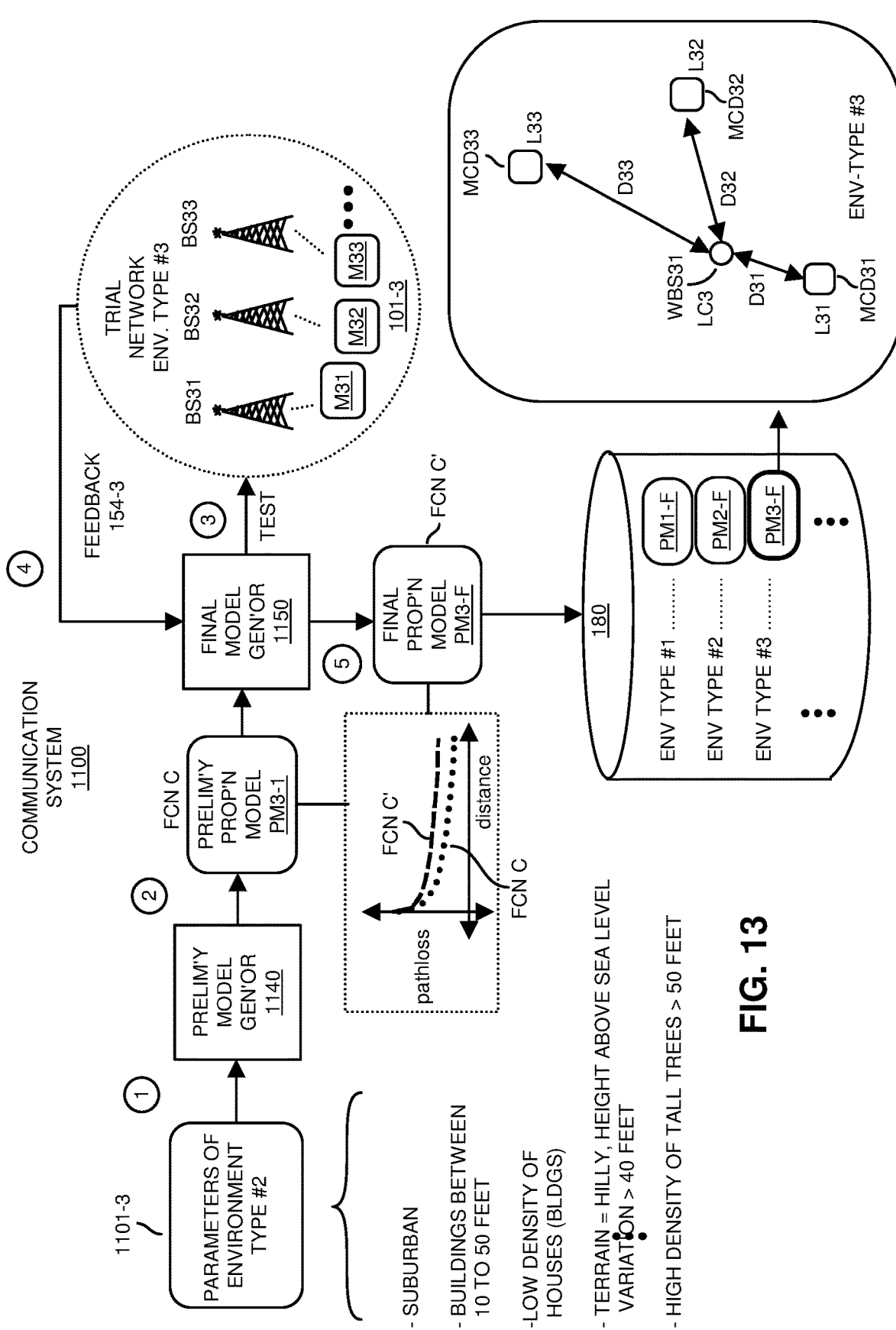
FIG. 13 is an example diagram illustrating refinement of a third pathloss model associated with a third environment type based on corresponding pathloss feedback information collected from multiple wireless stations as discussed herein.

FIG. 13 is an example diagram illustrating refinement of a third pathloss model associated with a third environment type based on corresponding pathloss feedback information collected from multiple wireless stations as discussed herein.

In this example, the communication system 1100 as discussed herein includes preliminary model generator 1140 (such as communication management resource), final model generator 1150 (communication management resource), repository 180, trial network environment type #3 (including base station BS31, base station BS32, base station BS33 . . . mobile communication device M31, mobile communication device M32, mobile communication device M33, . . . ), and so on.

Further in this example, in processing operation #1, the preliminary model generator 1140 receives parameters indicating attributes of the second type of network environment 101-3 (type #3). For example, the attributes as specified by the parameters 1101-3 indicate that the environment type #3 is located in a suburban area having: i) buildings such as homes between 10 and 50 feet in height, ii) low density of buildings such as one per 10 acres, iii) generally hilly terrain varying by greater than 40 feet at different locations in a corresponding geographical region occupied by network environment 101-3, iv) high density of tall trees, etc.

Based on the received parameters, in processing operation #2, the preliminary model generator 1140 produces the preliminary propagation model PM3-1 (pathloss or attenuation versus distance from base station) as indicated by the function FCN C. The preliminary propagation model PM3-1 is a best guess as to pathloss associated with one or more wireless signals transmitted by respective wireless stations in the network environment 101-3 based on the received attributes. The preliminary model PM3-1 may not be accurate. For example, actual attenuation and/or pathloss in the network environment 101-3 may be different than as indicated by the preliminary model PM3-1.

As further discussed below, examples herein include testing of the environment 101-3 (type #3) to determine actual pathlosses associated with signals wirelessly transmitted from the one or more wireless base stations to the mobile communication devices or actual wireless pathlosses associated with signals wirelessly transmitted from the mobile communication devices to the wireless base stations.

More specifically, in processing operation #3, the final model generator 1150 provides notification of test operations associated with the wireless stations (such as base station BS31, base station BS32 . . . mobile communication device M31, mobile communication device M32, etc.) in which wireless stations in the network environment 101-3 provide feedback associated with transmitted wireless signals as well as received wireless signals.

In processing operation #4 (pathloss testing), the wireless stations in wireless network environment 101-3 communicate with each other via wireless signals. The wireless base stations track a power level of wirelessly transmitting signals to the mobile communication devices; the mobile communication devices track a magnitude of the wireless signals received from the wireless base stations. The mobile communication devices track a magnitude of the wireless signals transmitted to the wireless base stations; the wireless base stations track a power level of wirelessly receiving signals from the mobile communication devices.

The feedback 154-3 from the wireless base stations and mobile communication devices in network environment 101-3 indicates information such as: i) a wireless power level of the wireless base station BS31 transmitting a first wireless signal to the mobile communication device M31, ii) a wireless power level of the mobile communication device M31 receiving the first wireless signal, iii) location of the wireless base station BS31, iv) location of the mobile communication device M31.

The final model generator 1150 uses the received feedback 154-3 to determine a respective actual path loss between the wireless base station BS31 and the mobile communication device M31. The final model generator 1150 then uses the respective feedback and determined actual path loss between the wireless base station BS31 and the mobile communication device M31 and calculated distance between the wireless base station BS31 and mobile communication device M31 (based on a difference or distance between the location of the base station BS31 and the location of the mobile communication device M31) as a basis in which to update the corresponding received preliminary model PM3-1 so that it is more accurate to determine pathloss.

Accordingly, each iteration and update of the preliminary model PM3-1 to the final model PM3-F (pathloss or attenuation versus distance from base station as indicated by the function FCN C') provides a better or more accurate indication of path loss (such as wireless signal attenuation) between a wireless base station and a mobile communication device in the type #3 network environment.

Further, in processing operation #4 (based on pathloss testing), the feedback 154-3 from the wireless base stations and mobile communication devices in network environment 101-3 indicates information such as: i) a wireless power level of the wireless base station BS31 transmitting a second wireless signal to the mobile communication device M32, ii) a wireless power level of the mobile communication device M32 receiving the second wireless signal, iii) location of the wireless base station BS31, iv) location of the mobile communication device M32. The final model generator 1150 uses the received feedback 154-3 to determine a respective actual path loss between the wireless base station BS31 and the mobile communication device M32. The final model generator 1150 uses the respective feedback and determined actual path loss between the wireless base station BS31 and the mobile communication device M32 and calculated distance between the wireless base station BS31 and mobile communication device M32 (based on a difference or distance between the location of the base station BS31 and the location of the mobile communication device M32) as a basis in which to update the corresponding received preliminary model PM3-1.

Yet further, in processing operation #4 (based on pathloss testing), the feedback 154-3 from the wireless base stations and mobile communication devices in network environment 101-3 indicates information such as: i) a wireless power level of the wireless base station BS31 transmitting a third wireless signal to the mobile communication device M33, ii) a wireless power level of the mobile communication device M33 receiving the third wireless signal, iii) location of the wireless base station BS31, iv) location of the mobile communication device M33.

The final model generator 1150 uses the received feedback 154-3 to determine a respective actual path loss between the wireless base station BS31 and the mobile communication device M33. The final model generator 1150 uses the respective feedback and determined actual path loss between the wireless base station BS31 and the mobile communication device M33 and calculated distance between the wireless base station B31 and mobile communication device M33 (based on a difference or distance between the location of the base station BS31 and the location of the mobile communication device M33) as a basis in which to update the corresponding received preliminary model PM3-1.

Accordingly, each iteration and update of the preliminary model PM3-1 towards the final model PM3-F based on feedback 154-3 provides a better or more accurate indication of path loss (such as wireless signal attenuation) between a wireless base station and a mobile communication device in the type #3 network environment.

This iterative process of testing the respective network environment 101-3 and receiving respective feedback 154-3 ensures that each updated version of the pathloss model PL3 associated with environment type #3 is successively more accurate such that it properly or better reflects pathloss and corresponding attenuation of wireless signals transmitted in the network environment 101-3. Knowing the pathloss to higher degree of accuracy in the network environment type #3 (and other geographical regions of the same type #3 environment) is desirable because it enables more efficient use of the wireless bandwidth to communicate in the network environment 101-3. For example, the pathloss information or propagation information as indicated by the respective final (pathloss or propagation) model PM3-F enables a respective wireless station in a respective geographical region of the corresponding type #3 of network environment 101-3 (type #3) to determine what signal strength is needed to communicate to a target wireless station in the network environment.

In processing operation #5, the final model generator 1150 produces the final model PM3-F for storage in the repository 180. The repository 180 provides a respective mapping between the environment type #3 and the corresponding final model PM3-F as further shown in FIG. 13, the model PM3-F can be used to determine a respective path loss between wireless stations presence in network environments of type #3. For example, via the corresponding final model PM3-F, the corresponding communication management entity can be configured to determine a respective path loss between the wireless base station WBS31 at location L31 and any of the corresponding mobile communication devices. For example, via the final model PM3-F, a respective communication management entity determines the pathloss between wireless base station WBS31 and mobile communication device MCD31 at location L31 as pathloss PL31; via the final model PM3-F, a respective communication management entity determines the pathloss between wireless base station WBS31 and mobile communication device MCD32 at location L32 as pathloss P32; via the final model PM3-F, a respective communication management entity determines the pathloss between wireless base station WBS31 and mobile communication device MCD33 at location L33 as pathloss PL33; and so on.

Figure 14:
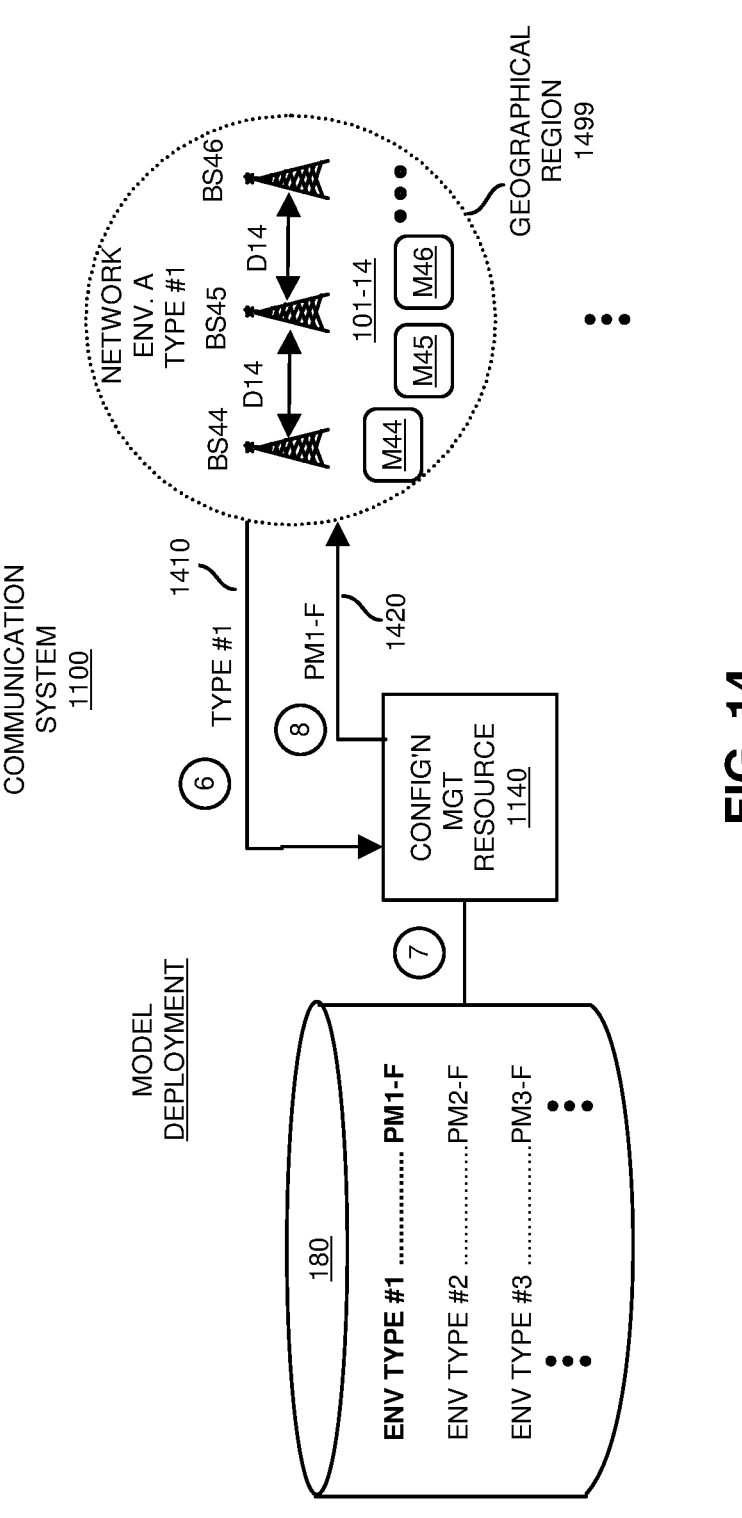
FIG. 14 is an example diagram illustrating implementation of the first pathloss model in multiple network environments of the first type as discussed herein.

FIG. 14 is an example diagram illustrating implementation of the first pathloss model in multiple network environments of the first type as discussed herein.

As shown in FIG. 14, communication system 1100 includes configuration management resource 1140 (such as communication management resource) to implement use of the different propagation models in respective wireless networks.

In processing operation #6, the configuration management resource 1140 receives communications 1410 including attributes associated with the geographical region 1499 where new wireless network 101-14 and corresponding new wireless base stations are to be installed. The configuration management resource 1140 analyzes the received attributes associated with geographical region 1499 to determine its type.

For example, assume that the received communications 1410 (from any suitable entity) indicate that the geographical region 1499 is located in a city having: i) buildings greater than 100 feet in height, ii) buildings of density greater than 1 per acre, iii) generally flat terrain deviating less than 10 feet in height in a corresponding geographical region occupied by network environment 101-14, etc. In such an instance, the configuration management resource 1140 detects that the type associated with the geographical region 1499 is type #1 because the attributes match or substantially match within a threshold level the attributes associated with the corresponding geographical region associated with wireless network 101-1.

In such an instance, in processing operation #7, the configuration management resource 1140 maps the determined type #1 and/or corresponding attributes associated with the geographical region 1499 to the pathloss model PM1-F stored in repository 180.

In processing operation #8, the pathloss model PM1-F can be used to determine a respective distance between the new wireless base stations in the geographical region 1499. For example, a wireless transmit power level of a wireless base station in geographical region 1499 is known; the pathloss is known; the minimum magnitude of wireless signal required for a respective mobile communication device to receive data is known. A combination of these factors defines a respective spacing between wireless base stations in the geographical region 1499 such that the installed wireless base station provide complete wireless coverage in geographical region 1499.

Thus, in processing operation #8, the configuration management resource 1140 then uses the pathloss model PM1-F as a basis to determine how many and where to install one or more new wireless base stations in the geographical region 1449 to create a wireless network environment 101-14. For example, as its name suggests, the pathloss model PL1-F indicates the pathloss associated with the wireless signals transmitted in the geographical region 1499. Such pathloss information as indicated by the pathloss model 101-14 can be used to determine a spacing of one wireless base station BS44 with respect to another wireless base station BS45 in the geographical region 1499 such that the wireless base stations in geographical region 1499 provide wireless coverage without any nulls. In other words, if the wireless base stations are too far apart, then there will be location in the geographical region in which a respective mobile communication device will not be able to communicate with the wireless base station and access a respective remote network. However, the pathloss model PM1-F indicates a degree of pathloss in the geographical region 1499 and is used to determine appropriate wireless base station spacing.

In general, the spacing D14 between wireless base station BS44 and wireless base station BS45 is chosen such that a respective mobile communication device at the midpoint (D14/2) between the base station BS44 and base station BS45 receives a wireless signal from the base station BS44 at a desired power level accounting for wireless signal pathloss as specified by the pathloss model PM1-F and the respective mobile communication device at the midpoint (D14/2) between the base station BS44 and base station BS45 receives a wireless signal from the base station BS45 at a desired power level accounting for wireless signal pathloss as specified by the pathloss model PM1-F.

If desired, note that the configuration management resource 1140 can be configured to transmit the pathloss model PM1-F to one or more entities (such as wireless base station BS44, wireless base station BS45, wireless base station BS46, communication device M44, communication device M45, communication device M46, etc.) in the wireless network 101-14. The one or more entities in the wireless network 101-14 receiving the pathloss model PM1-F can be configured to use the pathloss, PM1-F to determine pathloss and/or signal propagation qualities of wireless signals transmitted in the wireless network 101-14.

Figure 15:
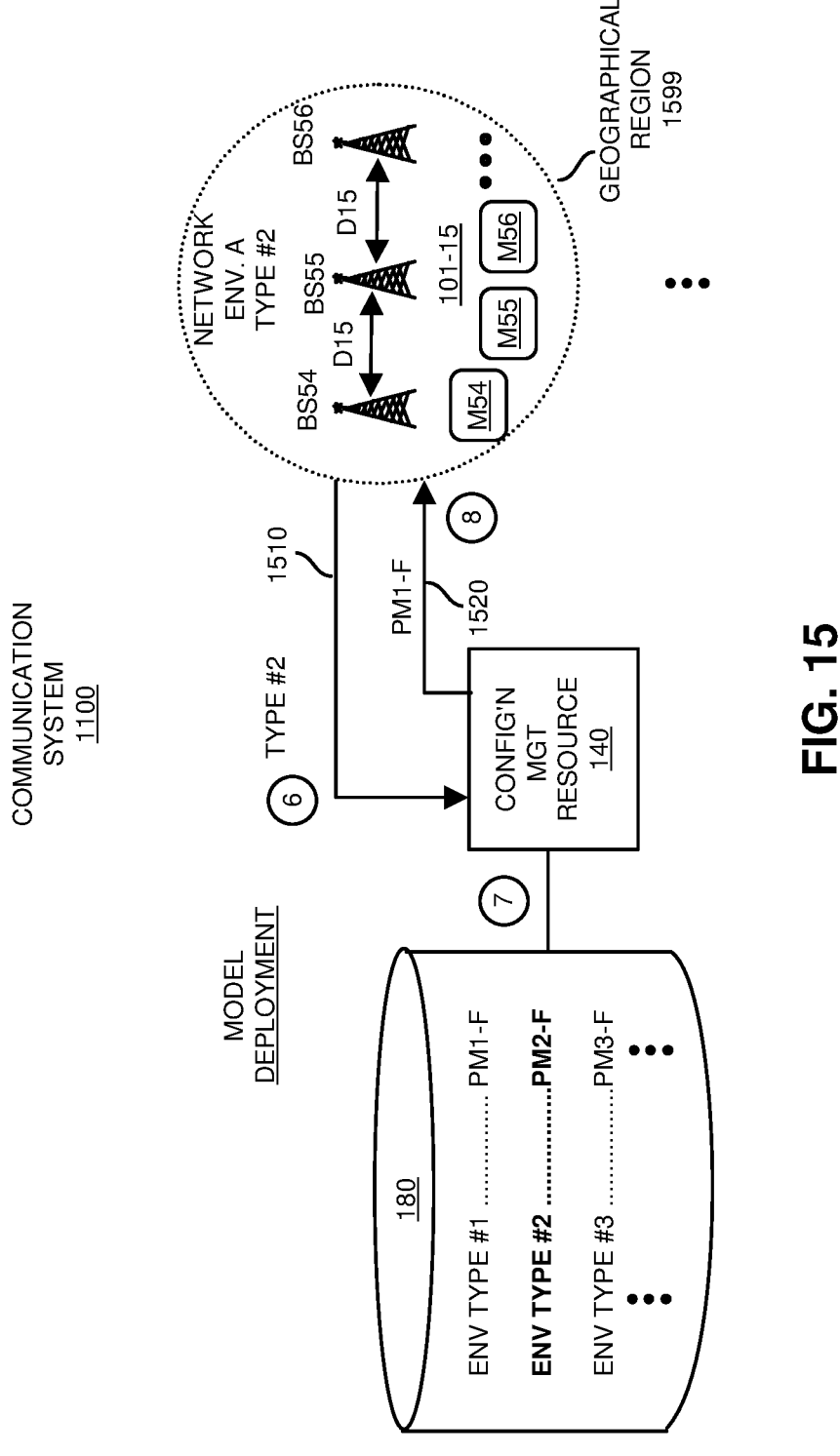
FIG. 15 is an example diagram illustrating implementation of the second pathloss model in multiple network environments of the second type as discussed herein.

FIG. 15 is an example diagram illustrating implementation of the second pathloss model in multiple network environments of the second type as discussed herein.

As shown in FIG. 15, communication system 1100 includes configuration management resource 1140 to implement use of the different propagation models in respective wireless networks.

In processing operation #6, the configuration management resource 1140 receives communications 1510 including attributes associated with the geographical region 1599 where new wireless network 101-14 and corresponding new wireless base stations are to be installed. The configuration management resource 1140 analyzes the received attributes associated with geographical region 1599 to determine its type.

For example, assume that the received communications 1510 (from any suitable entity) indicate that the geographical region 1599 is located in a city having: i) buildings greater than 100 feet in height, ii) buildings of density greater than 1 per acre, iii) generally flat terrain deviating less than 10 feet in height in a corresponding geographical region occupied by network environment 101-14, etc. In such an instance, the configuration management resource 1140 detects that the type associated with the geographical region 1599 is type #2 because the attributes match or substantially match within a threshold level the attributes associated with the corresponding geographical region associated with wireless network 101-2.

In such an instance, in processing operation #7, the configuration management resource 1140 maps the determined type #2 and/or corresponding attributes associated with the geographical region 1599 to the pathloss model PM2-F stored in repository 180.

In processing operation #8, the pathloss model PM2-F can be used to determine a respective distance between the new wireless base stations in the geographical region 1599. For example, a wireless transmit power level of a wireless base station in geographical region 1599 is known; the pathloss is known; the minimum magnitude of wireless signal required for a respective mobile communication device to receive data in a wireless signal by a mobile communication device is known. A combination of these factors defines a respective spacing between wireless base stations in the geographical region 1499 such that the installed wireless base stations provide complete wireless coverage in geographical region 1499.

Thus, in processing operation #8, the configuration management resource 1140 then uses the pathloss model PM2-F as a basis to determine how many and where to install one or more new wireless base stations in the geographical region 1599 to create a wireless network environment 101-15. For example, as its name suggests, the pathloss model PL2-F indicates the pathloss associated with the wireless signals transmitted in the geographical region 1599. Such pathloss information as indicated by the pathloss model 101-15 can be used to determine a spacing of one wireless base station BS54 with respect to another wireless base station BS55 in the geographical region 1599 such that the wireless base stations in geographical region 1599 provide wireless coverage without any nulls. In other words, if the wireless base stations are too far apart, then there will be location in the geographical region in which a respective mobile communication device will not be able to communicate with the wireless base station and access a respective remote network. However, the pathloss model PM2-F indicates a degree of pathloss in the geographical region 1599 and is used to determine appropriate wireless base station spacing.

In general, the spacing D15 between wireless base station BS54 and wireless base station BS55 is chosen such that a respective mobile communication device at the midpoint (D15/2) between the base station BS54 and base station BS55 receives a wireless signal from the base station BS54 at a desired power level accounting for wireless signal pathloss as specified by the pathloss model PM2-F and the respective mobile communication device at the midpoint (D15/2) between the base station BS54 and base station BS55 receives a wireless signal from the base station BS55 at a desired power level accounting for wireless signal pathloss as specified by the pathloss model PM2-F.

If desired, the configuration management resource 1140 can be configured to transmit the pathloss model PM2-F to one or more entities (such as wireless base station BS54, wireless base station BS55, wireless base station BS56, communication device M54, communication device M55, communication device M56, etc.) in the wireless network 101-15. The one or more entities in the wireless network 101-15 receiving the pathloss model PM2-F can be configured to use the pathloss, PM2-F to determine pathloss and/or signal propagation qualities of wireless signals transmitted in the wireless network 101-15.

Figure 16:
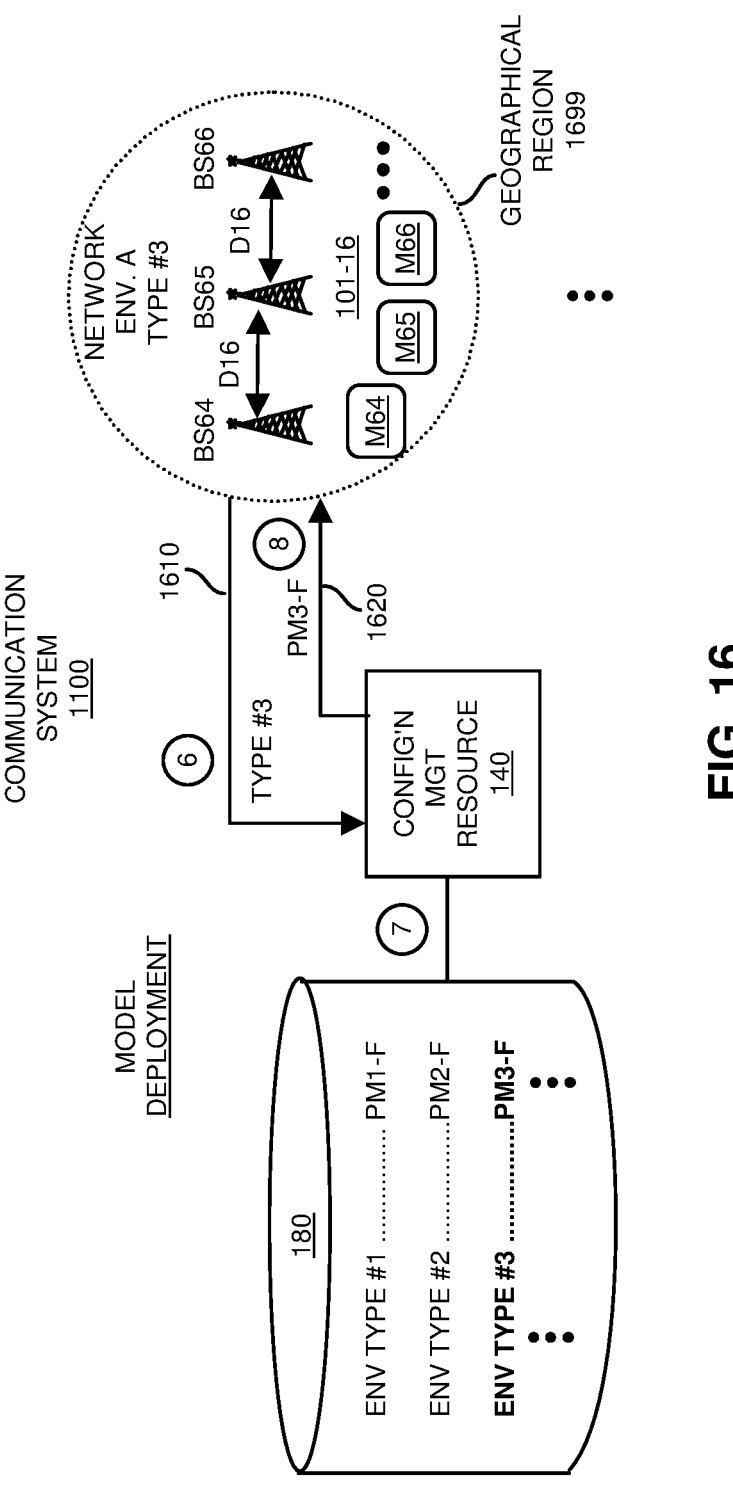
FIG. 16 is an example diagram illustrating implementation of the third pathloss model in multiple network environments of the third type as discussed herein.

FIG. 16 is an example diagram illustrating implementation of the third pathloss model in multiple network environments of the third type as discussed herein.

As shown in FIG. 16, communication system 1100 includes configuration management resource 1140 to implement use of the different propagation models in respective wireless networks.

In processing operation #6, the configuration management resource 1140 receives communications 1610 including attributes associated with the geographical region 1699 where new wireless network 101-16 and corresponding new wireless base stations are to be installed. The configuration management resource 1140 analyzes the received attributes associated with geographical region 1699 to determine its type.

For example, assume that the received communications 1610 (from any suitable entity) indicate that the geographical region 1699 is located in a city having: i) buildings greater than 100 feet in height, ii) buildings of density greater than 1 per acre, iii) generally flat terrain deviating less than 10 feet in height in a corresponding geographical region occupied by network environment 101-14, etc. In such an instance, the configuration management resource 1140 detects that the type associated with the geographical region 1699 is type #2 because the attributes match or substantially match within a threshold level the attributes associated with the corresponding geographical region associated with wireless network 101-3.

In such an instance, in processing operation #7, the configuration management resource 1140 maps the determined type #3 and/or corresponding attributes associated with the geographical region 1699 to the pathloss model PM3-F stored in repository 180.

In processing operation #8, the pathloss model PM3-F can be used to determine a respective distance between the new wireless base stations in the geographical region 1699. For example, a wireless transmit power level of a wireless base station in geographical region 1699 is known; the pathloss is known; the minimum magnitude of wireless signal required for a respective mobile communication device to receive data in a wireless signal by a mobile communication device is known. A combination of these factors defines a respective spacing between wireless base stations in the geographical region 1699 such that the installed wireless base stations provide complete wireless coverage in geographical region 1499.

Thus, in processing operation #8, the configuration management resource 1140 then uses the pathloss model PM3-F as a basis to determine how many and where to install one or more new wireless base stations in the geographical region 1699 to create a wireless network environment 101-16. For example, as its name suggests, the pathloss model PL3-F indicates the pathloss associated with the wireless signals transmitted in the geographical region 1699. Such pathloss information as indicated by the pathloss model 101-16 can be used to determine a spacing of one wireless base station BS64 with respect to another wireless base station BS65 in the geographical region 1699 such that the wireless base stations in geographical region 1699 provide wireless coverage without any nulls. In other words, if the wireless base stations are too far apart, then there will be location in the geographical region in which a respective mobile communication device will not be able to communicate with the wireless base station and access a respective remote network. However, the pathloss model PM3-F indicates a degree of pathloss in the geographical region 1699 and is used to determine appropriate wireless base station spacing.

In general, the spacing D16 between wireless base station BS64 and wireless base station BS65 is chosen such that a respective mobile communication device at the midpoint (D16/2) between the base station BS64 and base station BS65 receives a wireless signal from the base station BS64 at a desired power level accounting for wireless signal pathloss as specified by the pathloss model PM3-F and the respective mobile communication device at the midpoint (D16/2) between the base station BS64 and base station BS65 receives a wireless signal from the base station BS65 at a desired power level accounting for wireless signal pathloss as specified by the pathloss model PM3-F.

If desired, the configuration management resource 1140 can be configured to transmit the pathloss model PM3-F to one or more entities (such as wireless base station BS64, wireless base station BS65, wireless base station BS66, communication device M64, communication device M65, communication device M66, etc.) in the wireless network 101-16. The one or more entities in the wireless network 101-16 receiving the pathloss model PM3-F can be configured to use the pathloss, PM3-F to determine pathloss and/or signal propagation qualities of wireless signals transmitted in the wireless network 101-16.

Figure 17:
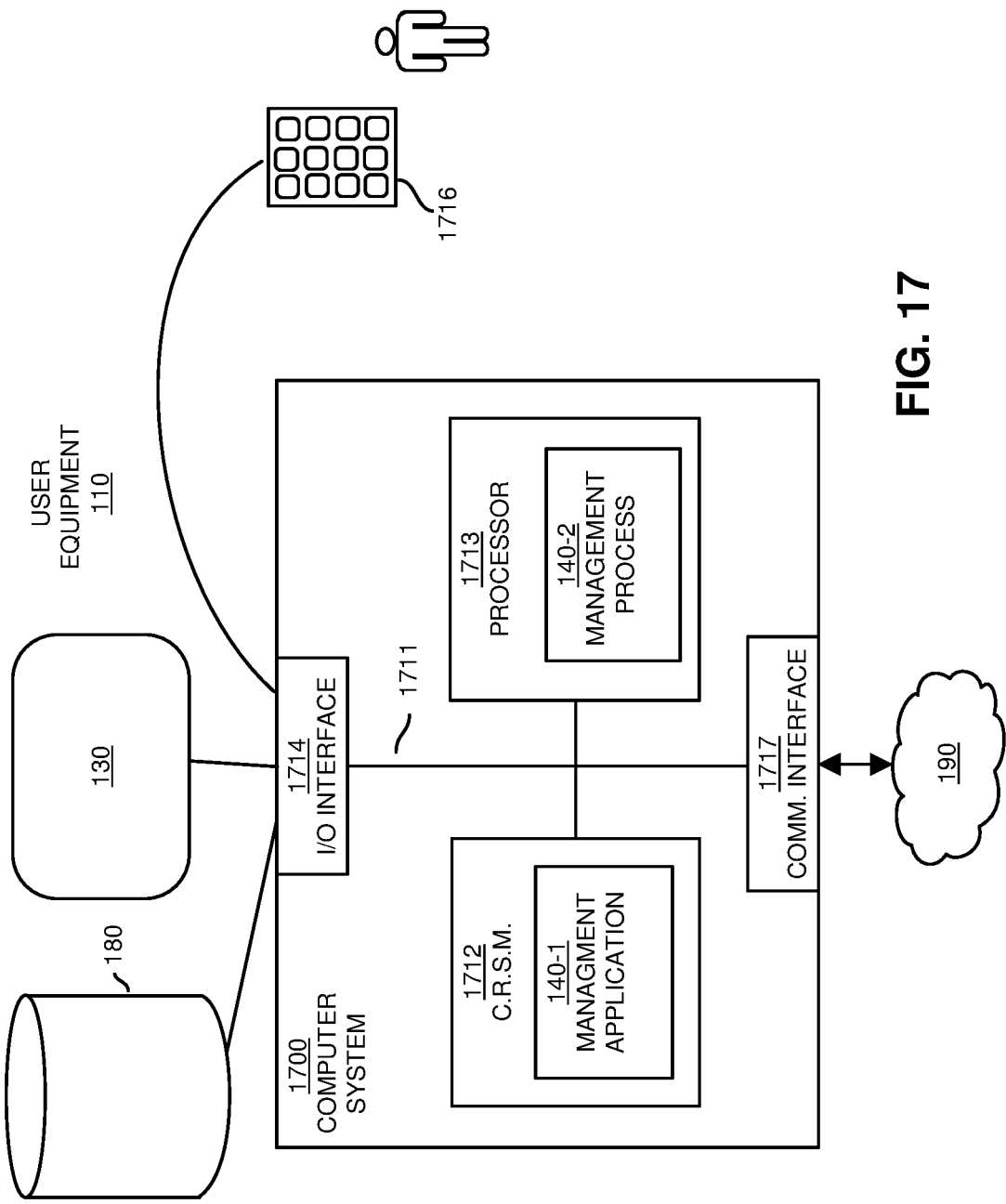
FIG. 17 is an example diagram illustrating example computer hardware and software operable to execute operations according to embodiments herein.

FIG. 17 is an example block diagram of a computer system for implementing any of the operations as previously discussed according to embodiments herein.

Note that any of the resources (such as configuration management resource 140, simulation verification resource 160, order system 480, etc.) as discussed herein can be configured to include computer processor hardware and/or corresponding executable instructions to carry out the different operations as discussed herein.

For example, as shown, computer system 1750 of the present example includes interconnect 1711 coupling computer readable storage media 1712 such as a non-transitory type of media (which can be any suitable type of hardware storage medium in which digital information can be stored and or retrieved), a processor 1713 (computer processor hardware), I/O interface 1714, and a communications interface 1717.

I/O interface(s) 1714 supports connectivity to repository 1780 and input resource 1792.

Computer readable storage medium 1712 can be any hardware storage device such as memory, optical storage, hard drive, floppy disk, etc. In one embodiment, the computer readable storage medium 1712 stores instructions and/or data.

As shown, computer readable storage media 1712 can be encoded with management application 140-1 (e.g., including instructions) in a respective wireless station to carry out any of the operations as discussed herein.

During operation of one embodiment, processor 1713 accesses computer readable storage media 1712 via the use of interconnect 1711 in order to launch, run, execute, interpret or otherwise perform the instructions in management application 140-1 stored on computer readable storage medium 1712. Execution of the management application 140-1 produces management process 140-2 to carry out any of the operations and/or processes as discussed herein.

Those skilled in the art will understand that the computer system 1750 can include other processes and/or software and hardware components, such as an operating system that controls allocation and use of hardware resources to execute the management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1750 may reside at any location or can be included in any suitable resource in any network environment to implement functionality as discussed herein.

Functionality supported by the different resources will now be discussed via flowcharts in FIG. 18. Note that the steps in the flowcharts below can be executed in any suitable order.

FIG. 18 is a flowchart 1800 illustrating an example method according to embodiments herein. Note that there will be some overlap with respect to concepts as discussed above.

In processing operation 1810, the management system (such as any of the components as discussed herein) as discussed herein receives a first preliminary wireless pathloss model. The first preliminary wireless pathloss model indicates anticipated pathloss between a first wireless base station and different locations in a first geographical region.

In processing operation 1820, the management system receives feedback generated by multiple wireless stations in first geographical region. The feedback indicates actual pathloss associated with the wireless stations in the first geographical region receiving wireless signals from the first wireless base station.

In processing operation 1830, the management system iteratively applies the feedback to the first preliminary pathloss model to produce a final first pathloss model associated with the first geographical region.

In processing operation 1840, the management system receives attributes of a second geographical region in which to deploy a respective previously created pathloss model.

In processing operation 1850, based on the attributes of the second geographical region being similar to attributes of the first geographical region, the management system as discussed herein detects a likeness of a type associated with the second geographical region to a type associated with the first geographical region above a threshold level.

In processing operation 1860, in response to detecting the likeness above the threshold level, the management system as discussed herein utilizes the final first pathloss model associated with the first geographical region to determine pathlosses between a second wireless base station in the second geographical region and different locations in the second geographical region.

Figure 19:
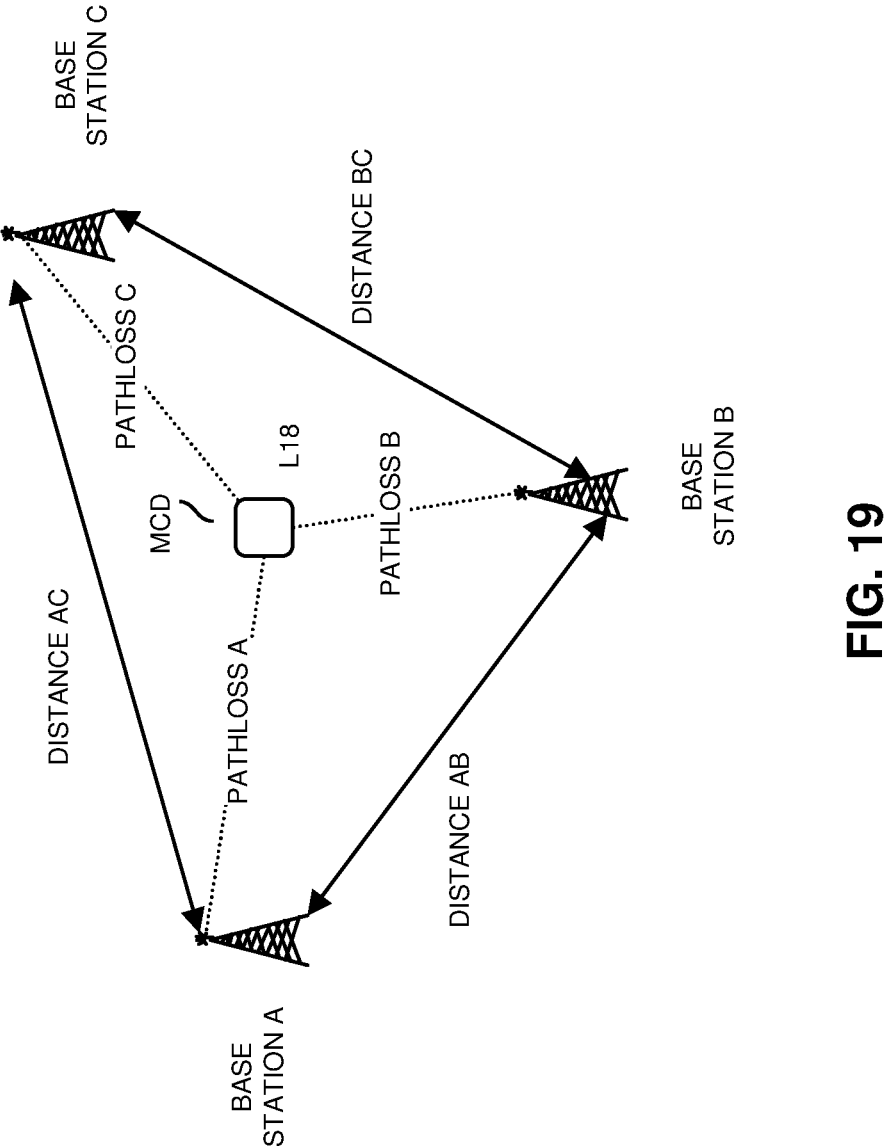
FIG. 19 is an example diagram illustrating implementation of pathloss information to provide spacing of wireless base stations as discussed herein.

FIG. 19 is an example diagram illustrating implementation of pathloss information to provide spacing of wireless base stations as discussed herein.

In this example:

$$\text{Free space pathloss (dB)} = 32.45 + 20 \log (d\_meters) + 20 \log(f\_Mhz)$$

d_meter represents the distance from transmitter (such as a wireless base station A, B, or C) to a receiver (such as mobile communication device). After distances have been identified for all the 360 degree points, embodiments herein include calculating the inter site distance (or distance between base station pairs).

Note that the degree from base stations while calculating the distance (d_meters), take the points from base stations to mobile (+/−10 deg) from the direction of each base stations to add accuracy.

Note again that embodiments in this disclosure are is not specific to Wi-Fi and can be applied to any wireless technology such as (4G/5G/or future generations) along with machine learning art which can help produce accuracy in the pathloss models.

FIG. 20 is an example chart illustrating pathloss versus distance and received signal strength as discussed herein.

In this example: solving for d_meters (maximum distance between a respective wireless base station and the mobile communication device):

d_meters =

$$1 * \text{POWER}\big(10, \big((\text{pathloss(dB)} - 32.45 - 20 * \text{LOG(f\_GHz)})/20\big)\big)$$

calculated signal strength =

$$EIRP - [32.45 + 20 \log(\text{d\_meters}) + 20 \log(\text{f\_Ghz})]$$

where EIRP=Transmit_Power+Antenna Gain−cable loss

These equations are used to calculate distance up to which the signal can travel at maximum distance from a wireless base station to the mobile communication device, while calculated signal strength (see chart 2020) will provide effective expected received power at cell edge distance and pathloss.

Each environment will have different characteristics which can be demonstrated using above two formulas (calculated signal strength and distance of d_meters).

Note again that techniques herein are well suited to determine actual locations of installed physical assets in a network environment and generation of a proposed wireless network installation plan for implementation of the new wireless network. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:

receiving a preliminary wireless pathloss model, the preliminary wireless pathloss model indicating expected pathloss between a first wireless base station and different locations in a first geographical region;

receiving feedback generated by multiple wireless stations in the first geographical region, the feedback indicating actual pathloss associated with the multiple wireless stations in the first geographical region receiving wireless signals transmitted from the first wireless base station; and applying the feedback to the preliminary wireless pathloss model to produce an updated wireless pathloss model associated with the first geographical region.

2. The method as in claim 1, wherein receiving the feedback includes receiving location information indicating locations of the multiple wireless stations in the first geographical region.

3. The method as in claim 2, wherein receiving the feedback further includes receiving power level information indicating wireless power levels of the multiple wireless stations receiving the wireless signals from the first wireless base station.

4. The method as in claim 3, wherein applying the feedback to the preliminary wireless pathloss model includes:

utilizing the location information and the power level information to determine, for each of the different locations in the first geographical region, a respective pathloss between a corresponding location in the first geographical region and the first wireless base station; and adjusting a pathloss function of the preliminary wireless pathloss model based on the respective pathlosses for the different locations in the first geographical region.

5. The method as in claim 1 further comprising:

receiving attributes of a second geographical region;

based on the attributes of the second geographical region, detecting a match of a type associated with the second geographical region to a type associated with the first geographical region; and in response to detecting the match being greater than a threshold level, utilizing the updated wireless pathloss model to determine pathlosses associated with the second geographical region.

6. The method as in claim 5 further comprising:

based on determined pathlosses associated with the second geographical region as indicated by the updated wireless pathloss model, selecting a location in which to install a second wireless base station in the second geographical region to provide mobile communication devices in the second geographical region access to a remote network through the second wireless base station.

7. The method as in claim 1, wherein the updated wireless pathloss model indicates wireless pathloss versus distance with respect to the first wireless base station in the first geographical region.

8. The method as in claim 1, wherein applying the feedback includes:

iteratively applying different instances of the feedback to the preliminary wireless pathloss model to produce the updated wireless pathloss model.

9. The method as in claim 8, wherein each iteration of applying the feedback reduces an error associated with a pathloss value as indicated by the first preliminary pathloss model.

10. The method as in claim 1 further comprising:

deriving a distance value from the updated pathloss model; and utilizing the distance value to implement a spacing between wireless base stations in a second geographical region.

11. The method as in claim 1, wherein the updated wireless pathloss model indicates wireless signal attenuation as a function of distance with respect to the first wireless base station.

12. The method as in claim 1, wherein the wireless signals are first wireless signals, the method further comprising:

determining a likeness of a second geographical region with respect to the first geographical region; and in response to detecting the likeness above a threshold level, implementing the updated wireless pathloss model to determine attenuation of second wireless signals transmitted in the second geographical region.

13. The method as in claim 12, wherein determining the likeness of the second geographical region with respect to the first geographical region includes:

comparing a terrain of the second geographical region to a terrain of the first geographical region.

14. The method as in claim 1 further comprising:

determining a type associated with the first geographical region based on physical attributes of the first geographical region; and assigning the determined type to the first geographical region.

15. The method as in claim 14, wherein the physical attributes of the first geographical region include a density of physical infrastructure in the first geographical region.

16. The method as in claim 1, wherein receiving the feedback includes: i) receiving location information indicating locations of the multiple wireless stations in the first geographical region; ii) receiving power level information indicating wireless power levels of the multiple wireless stations receiving the wireless signals transmitted from the first wireless base station; and wherein applying the feedback to the preliminary wireless pathloss model includes: adjusting a pathloss function of the preliminary wireless pathloss model based on respective pathlosses for the multiple different locations in the first geographical region, the respective pathlosses determined from the location information in the power level information.

17. The method as in claim 1, wherein the preliminary wireless pathloss model is generated based on physical parameters of a respective environment in which the first wireless base station resides.

18. The method as in claim 1, wherein the wireless signals transmitted from the first wireless base station include an identity of the first wireless base station.

19. The method as in claim 1, wherein the multiple wireless stations include a first mobile communication device and a second mobile communication device;

wherein the wireless signals include a first wireless signal and a second wireless signal transmitted from the first wireless base station; and wherein the feedback indicates: i) a first actual pathloss associated with conveyance of the first wireless signal from the first wireless base station to the first mobile communication device, and ii) a second actual pathloss associated with conveyance of the second wireless signal from the first wireless base station to the second mobile communication device.

20. The method as in claim 19, wherein applying the feedback includes:

producing the updated wireless pathloss model based at least in part on the first actual pathloss and the second actual pathloss.

21. A system comprising:

communication management hardware operative to:

receive a preliminary wireless pathloss model, the preliminary wireless pathloss model indicating expected pathloss between a first wireless base station and different locations in a first geographical region;

receive feedback generated by multiple wireless stations in the first geographical region, the feedback indicating actual pathloss associated with the multiple wireless stations in the first geographical region receiving wireless signals transmitted from the first wireless base station; and apply the feedback to the preliminary wireless pathloss model to produce an updated wireless pathloss model associated with the first geographical region.

22. The system as in claim 21, wherein the communication management hardware is further operative to:

receive location information indicating locations of the multiple wireless stations in the first geographical region.

23. The system as in claim 22, wherein the communication management hardware is further operative to:

receive power level information indicating wireless power levels of the multiple wireless stations receiving the wireless signals from the first wireless base station.

24. The system as in claim 23, wherein the communication management hardware is further operative to:

utilize the location information and the power level information to determine, for each of the different locations in the first geographical region, a respective pathloss between a corresponding location in the first geographical region and the first wireless base station; and adjust a pathloss function of the preliminary wireless pathloss model based on the respective pathlosses for the different locations in the first geographical region.

25. The system as in claim 21, wherein the communication management hardware is further operative to:

receive attributes of a second geographical region;

based on the attributes of the second geographical region, detect a match of a type associated with the second geographical region to a type associated with the first geographical region; and in response to detecting the match above a threshold level, utilize the updated wireless pathloss model to determine pathlosses associated with the second geographical region.

26. The system as in claim 25, wherein the communication management hardware is further operative to:

based on determined pathlosses associated with the second geographical region as indicated by the updated wireless pathloss model, select a location in which to install a second wireless base station in the second geographical region to provide mobile communication devices in the second geographical region access to a remote network through the second wireless base station.

27. Non-transitory computer-readable media having instructions stored thereon, the instructions, when carried out by computer processor hardware, cause the computer processor hardware to:

receive a first preliminary wireless pathloss model, the first preliminary wireless pathloss model indicating expected pathloss between a first wireless base station and different locations in a first geographical region;

receive feedback generated by multiple wireless stations, the feedback indicating actual pathloss associated with the wireless stations in the first geographical region receiving wireless signals; and apply the feedback to the first preliminary pathloss model to produce an updated first pathloss model associated with the first geographical region.

\* \* \* \* \*